United States Patent
Harada

(10) Patent No.: US 7,904,808 B2
(45) Date of Patent: Mar. 8, 2011

(54) COMPUTER-READABLE RECORDING MEDIUM WHERE DOCUMENT MANAGEMENT PROGRAM IS RECORDED, DOCUMENT MANAGEMENT APPARATUS, AND DOCUMENT MANAGEMENT METHOD

(75) Inventor: Hiroaki Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 860 days.

(21) Appl. No.: 11/897,147

(22) Filed: Aug. 29, 2007

(65) Prior Publication Data
US 2008/0134025 A1   Jun. 5, 2008

(30) Foreign Application Priority Data

Dec. 1, 2006   (JP) ................. 2006-325493

(51) Int. Cl.
*G06F 17/21* (2006.01)
(52) U.S. Cl. ....................................... 715/255
(58) Field of Classification Search .............. 715/255
See application file for complete search history.

(56) References Cited

U.S. PATENT DOCUMENTS

| 6,067,541 A * | 5/2000 | Raju et al. ............................. 1/1 |
| 2003/0120690 A1* | 6/2003 | Schaeffer et al. ............. 707/500 |
| 2004/0015369 A1* | 1/2004 | Kim et al. ........................ 705/1 |

FOREIGN PATENT DOCUMENTS

| JP | 08-147292 | 6/1996 |
| JP | 2004-206173 | 7/2004 |

* cited by examiner

*Primary Examiner* — Doug Hutton
*Assistant Examiner* — Tionna Smith
(74) *Attorney, Agent, or Firm* — Greer, Burns & Crain, Ltd.

(57) ABSTRACT

A computer-readable recording medium on which a document management program capable of calculating an evaluation value for objectively judging information transparency in an organization is recorded. When an original document is inputted, a document input section stores the document in a document store section. After that, a document correction section corrects a character string of the document stored in the document store section in response to operation input and registers a correction history including a number of characters deleted by a character string deletion process and a correction history including a number of characters before replacement by a replacement process in a correction history table. A correction history analysis section uses an opacity rate the value of which becomes higher with an increase in the number of the characters deleted from the document or an increase in the number of the characters before the replacement by the replacement process and makes a decision table including the opacity rate.

17 Claims, 25 Drawing Sheets

122 OVERALL DECISION TABLE

| OLD DOCUMENT | NEW DOCUMENT | UPDATE TYPE | NUMBER OF CHARACTERS CHANGED | INDIVIDUAL INDICATOR | OVERALL INDICATOR |
|---|---|---|---|---|---|
| P0 | P1 | DELETION | 5 | DELETION RATE =5/143 ( 3.50% ) | OPACITY RATE =25/143 ( 17.48% ) |
| P0 | P1 | REPLACEMENT | 20 | REPLACEMENT RATE =20/143 ( 13.99% ) | |
| P1 | P2 | REPLACEMENT | 22 | REPLACEMENT RATE =22/119 ( 18.49% ) | OPACITY RATE =22/119 ( 18.49% ) |
| | | | | | |
| | | | | TOTAL OPACITY RATE= (25+22)/(143+119)=17.9% | |
| | | | | DEGREE OF SUPPRESSION = 5/(143+119)= 1.9 % | |
| | | | | DEGREE OF GLORIFICATION =(20+22)/(143+119)=16.0% | |

111 DOCUMENT

● AT THREE O'CLOCK IN THE AFTERNOON OF XX YY MR./MS. A WHO WAS THE PERSON IN CHARGE HAD A TELEPHONE CALL FROM A CUSTOMER (P COMPANY). MR./MS. A <u>RECEIVED THE CUSTOMER'S COMPLAINT</u> AND MADE A NOTE OF ITS CONTENTS. THE TELEPHONE CONVERSATION CONTINUED FOR ABOUT TEN MINUTES.

● MR./MS. A <u>COMPILED COUNTERMEASURES AGAINST THE COMPLAINT INTO A REPORT</u> AND <u>SUBMITTED THE REPORT TO MR./MS. B WHO WAS A SECTION CHIEF</u> AT SIX O'CLOCK IN THE AFTERNOON. IN MR./MS. B'S OPINION <u>MR./MS. A DID NOT NEED TO IMMEDIATELY MEET THE COMPLAINT</u>.

FIG. 5

112 DOCUMENT

● AT THREE O'CLOCK IN THE AFTERNOON OF XX YY MR./MS. A WHO WAS THE PERSON IN CHARGE HAD A TELEPHONE CALL FROM A CUSTOMER [DELETE] (P COMPANY). MR./MS. A RECEIVED THE CUSTOMER'S COMPLAINT AND MADE A NOTE OF ITS CONTENTS. THE TELEPHONE CONVERSATION CONTINUED FOR ABOUT TEN MINUTES.

● MR./MS. A COMPILED COUNTERMEASURES AGAINST THE COMPLAINT INTO A REPORT AND SUBMITTED THE REPORT TO MR./MS. B WHO WAS A SECTION CHIEF AT SIX O'CLOCK IN THE AFTERNOON. IN MR./MS. B'S OPINION [CHANGE] MR./MS. A SHOULD CAREFULLY MEET THE COMPLAINT.

FIG. 6

113 DOCUMENT

● AT THREE O'CLOCK IN THE AFTERNOON OF XX YY MR./MS. A WHO WAS THE PERSON IN CHARGE HAD A TELEPHONE CALL FROM A CUSTOMER. MR./MS. A RECEIVED THE CUSTOMER'S [CHANGE] OPINION AND MADE A NOTE OF ITS CONTENTS. THE TELEPHONE CONVERSATION CONTINUED FOR ABOUT TEN MINUTES.

● MR./MS. A COMPILED COUNTERMEASURES AGAINST THE OPINION INTO A REPORT AND SUBMITTED THE REPORT TO MR./MS. B WHO WAS A SECTION CHIEF AT SIX O'CLOCK IN THE AFTERNOON. IN MR./MS. B'S OPINION [CHANGE] MR./MS. A SHOULD POSITIVELY ADOPT THE CUSTOMER'S OPINION AND FULLY EXAMINE CONCRETE MEASURES.

FIG. 7

121 CORRECTION HISTORY TABLE

| CORRECTOR | CORRECTION TIME | OLD DOCUMENT | NEW DOCUMENT | CORRECTION TYPE | STARTING POINT | CHARACTER STRING LENGTH | OBJECT CHARACTER STRING |
|---|---|---|---|---|---|---|---|
| A | 2006/2/1 | P0 | P1 | DELETION | 20 | 5 | P COMPANY |
| A | 2006/2/1 | P0 | P1 | REPLACEMENT | 114 | 20 | MR./MS. A DID NOT NEED TO IMMEDIATELY MEET THE COMPLAINT → |
| B | 2006/2/2 | P1 | P2 | REPLACEMENT | 109 | 18 | MR./MS. A SHOULD CAREFULLY MEET THE COMPLAINT → MR./MS. A SHOULD POSITIVELY ADOPT THE CUSTOMER'S OPINION AND FULLY EXAMINE CONCRETE MEASURES |
| B | 2006/2/2 | P1 | P2 | REPLACEMENT | 33 | 4 | COMPLAINT → OPINION |
| | | | | | | | |

FIG. 13

122 OVERALL DECISION TABLE

| OLD DOCUMENT | NEW DOCUMENT | UPDATE TYPE | NUMBER OF CHARACTERS CHANGED | INDIVIDUAL INDICATOR | OVERALL INDICATOR |
|---|---|---|---|---|---|
| P0 | P1 | DELETION | 5 | DELETION RATE =5/143 (3.50%) | OPACITY RATE =25/143 (17.48%) |
| P0 | P1 | REPLACEMENT | 20 | REPLACEMENT RATE =20/143 (13.99%) | |
| P1 | P2 | REPLACEMENT | 22 | REPLACEMENT RATE =22/119 (18.49%) | OPACITY RATE =22/119 (18.49%) |
| | | | | TOTAL OPACITY RATE= (25+22)/(143+119)=17.9% | |
| | | | | DEGREE OF SUPPRESSION = 5/(143+119)= 1.9 % | |
| | | | | DEGREE OF GLORIFICATION =(20+22)/(143+119)=16.0% | |

FIG. 15

114 MARK INFORMATION TABLE

| OLD DOCUMENT | STARTING POINT | NUMBER OF CHARACTERS | CHARACTER STRING |
|---|---|---|---|
| P0 | 34 | 8 | THE CUSTOMER'S COMPLAINT |
| P0 | 71 | 12 | COMPILED COUNTERMEASURES AGAINST THE COMPLAINT INTO A REPORT |
| P0 | 93 | 10 | SUBMITTED THE REPORT TO MR./MS. B WHO WAS A SECTION CHIEF |
| P0 | 114 | 19 | MR./MS. A DID NOT NEED TO IMMEDIATELY MEET THE COMPLAINT |
| .... | | | |

121a CORRECTION HISTORY TABLE

| COR-RECTOR | CORRECTION TIME | OLD DOCUMENT | NEW DOCUMENT | CORRECTION TYPE | STARTING POINT | CHARACTER STRING LENGTH | OBJECT CHARACTER STRING | CORRECTION MARK CHARACTER NUMBER | MARK CHARACTER NUMBER |
|---|---|---|---|---|---|---|---|---|---|
| A | 2006/2/1 | P0 | P1 | DELETION | 20 | 5 | P COMPANY | | |
| A | 2006/2/1 | P0 | P1 | REPLACEMENT | 114 | 20 | MR./MS. A DID NOT NEED TO IMMEDIATELY MEET THE COMPLAINT → MR./MS. A SHOULD CAREFULLY MEET THE COMPLAINT | 20 | 20 |
| B | 2006/2/2 | P1 | P2 | REPLACEMENT | 109 | 18 | MR./MS. A SHOULD CAREFULLY MEET THE COMPLAINT → MR./MS. A SHOULD POSITIVELY ADOPT THE CUSTOMER'S OPINION AND FULLY EXAMINE CONCRETE MEASURES | | |
| B | 2006/2/2 | P1 | P2 | REPLACEMENT | 33 | 4 | COMPLAINT → OPINION | 4 | 8 |

123 EVALUATION CORRESPONDENCE TABLE

|  | DELETION RATE | ADDITION RATE | REPLACEMENT RATE | IMPORTANT PASSAGE CORRECTION RATE |
|---|---|---|---|---|
| DEGREE OF SUPPRESSION | 1.0 | 0 | 0 | 1.0 |
| DEGREE OF GLORIFICATION | 0 | 1.0 | 1.0 | 0 |
| TOTAL OPACITY RATE | 1.0 | 0 | 1.0 | 0.5 |
| .... |  |  |  |  |
|  |  |  |  |  |

FIG. 20

170 PERSONNEL DATABASE

| NAME | DIVISION | POST |
|---|---|---|
| A | SALES DEPARTMENT II | |
| B | SALES DEPARTMENT II | SECTION CHIEF |
| ... | ... | ... |

FIG. 23

124 TENDENCY ANALYSIS TABLE

| ITEM | AVERAGE OPACITY RATE | AVERAGE DEGREE OF SUPPRESSION | AVERAGE DEGREE OF GLORIFICATION |
|---|---|---|---|
| JANUARY THROUGH DECEMBER OF 2004 | 25.0% | 12.0% | 13.0% |
| JANUARY THROUGH DECEMBER OF 2005 | 33.0% | 15.0% | 18.0% |
| TOTAL IN MANUFACTURING DEPARTMENT | 30.0% | 20.0% | 10.0% |
| TOTAL IN SALES DEPARTMENT | 25.0% | 10.0% | 15.0% |
| LEVEL OF PERSON IN CHARGE | 10.0% | 5.0% | 5.0% |
| LEVEL OF SECTION CHIEF | 15.0% | 10.0% | 5.0% |
| LEVEL OF DEPARTMENT CHIEF | 40.0% | 20.0% | 20.0% |
|  |  |  |  |

FIG. 25

COMPUTER-READABLE RECORDING MEDIUM WHERE DOCUMENT MANAGEMENT PROGRAM IS RECORDED, DOCUMENT MANAGEMENT APPARATUS, AND DOCUMENT MANAGEMENT METHOD

CROSS-REFERENCE TO RELATED APPLICATIONS

This application is based upon and claims the benefits of priority from the prior Japanese Patent Application No. 2006-325493, filed on Dec. 1, 2006, the entire contents of which are incorporated herein by reference.

BACKGROUND OF THE INVENTION (1) Field of the Invention

This invention relates to a computer-readable recording medium where a document management program for managing a correction history of a document is recorded and a document management apparatus and a document management method for managing a correction history of a document and, more particularly, to a computer-readable recording medium where a document management program for managing a document updated by a plurality of users is recorded and a document management apparatus and a document management method for managing a document updated by a plurality of users.

(2) Description of the Related Art

Various documents are prepared and reported in organizations (such as enterprises, government offices, and self-governing bodies). In order to report to other divisions and high executives, a document prepared in some division is changed with some aim and is passed.

The original value of many documents, such as papers, is heightened by corrections made by many reviewers. Therefore, with documents of this kind making corrections in organizations has a great advantage.

On the other hand, if a document in which a problem at a job site is described in detail is corrected, facts are falsely reported and there is a risk that the problem will not come into the open. For example, the contents of the original document may be exaggerated, glorified, or suppressed by a person whose hands the document passes through. That is to say, an information manipulation may be performed. If such a state continues and infiltrates as the culture of an organization, the morals or morale of the organization falls and abuses occur in the activities themselves of the organization.

Accordingly, it is necessary to record the contents of a change made in the document. By recording what changes are made, an unjust information manipulation can be found. A change process can be retained by the use of, for example, the correction history store function of word processor software. In addition, a technique for comparing each line of a changed document with an original and for putting a correction mark indicative of being corrected on a line of the changed document including a correction is disclosed (see, for example, Japanese Patent Laid-Open Publication No. 08-147292).

With the conventional technique, however, it is impossible to know information transparency in a large-scale organization. In this case, information transparency indicates whether information is correctly reported to high executives in the organization regardless of whether a fact included in the information is good or bad.

With the conventional technique, a correction is indicated only by a mark or the like and the purpose in making the correction cannot be seen. Accordingly, if a correction is made in a document many times, it is difficult to judge whether an information manipulation, such as suppressing a fact, is included in these corrections. In addition, it is impossible to know whether an organization has a tendency to suppress information.

Accordingly, so far there have been no proper methods for sensing various abuses (abuse of problems at job sites not being reported correctly to high executives, the abuse of information being suppressed, and the like) in organizations. Whether information is suppressed can be conjectured by performing, for example, a questionnaire on employee awareness. However, abuses in organizations could not be observed directly. Therefore, it is impossible to objectively determine the degree of each abuse. Moreover, a questionnaire is expensive and it is impossible to carry out an observation timely (at any time).

SUMMARY OF THE INVENTION

The present invention was made under the background circumstances described above. An object of the present invention is to provide a computer-readable recording medium on which a document management program capable of calculating an evaluation value for objectively judging information transparency in an organization is recorded, a document management apparatus capable of calculating an evaluation value for objectively judging information transparency in an organization, and a document management method capable of calculating an evaluation value for objectively judging information transparency in an organization.

In order to achieve the above object, a computer-readable recording medium on which a document management program for managing a correction history of a document is recorded is provided. The document management program recorded on the recording medium makes a computer function as a document store section for storing the document, a correction history table store section for storing a correction history table, a document input section for accepting input of the document which is original and for storing the document inputted in the document store section, a document correction section for correcting a character string of the document stored in the document store section in response to operation input, for registering a correction history including a number of characters deleted by a character string deletion process and a correction history including a number of characters before replacement by a replacement process in the correction history table, and for storing the corrected document in the document store section, and a correction history analysis section for referring to the correction history table to make a decision table including an opacity rate, the opacity rate being a higher value with an increase in the number of the characters deleted from the document or an increase in the number of the characters before the replacement by the replacement process.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a view showing an example of a document newly registered.

FIG. 6 is a view showing the result of a first correction made in the document.

FIG. 7 is a view showing the result of a second correction made in the document.

FIG. 13 is a view showing an example of the data structure of a correction history table.

FIG. 15 is a view showing an example of the data structure of an overall decision table.

FIG. 17 is a view showing an example of the data structure of a mark information table.

FIG. 19 is a view showing an example of the data structure of a correction history table in the second embodiment of the present invention.

FIG. 20 is a view showing an example of the data structure of an evaluation correspondence table.

FIG. 23 is a view showing an example of the data structure of a personnel database.

FIG. 25 is a view showing an example of the data structure of a tendency analysis table.

DESCRIPTION OF THE PREFERRED EMBODIMENTS

Embodiments of the present invention will now be described with reference to the drawings.

Figure 1:
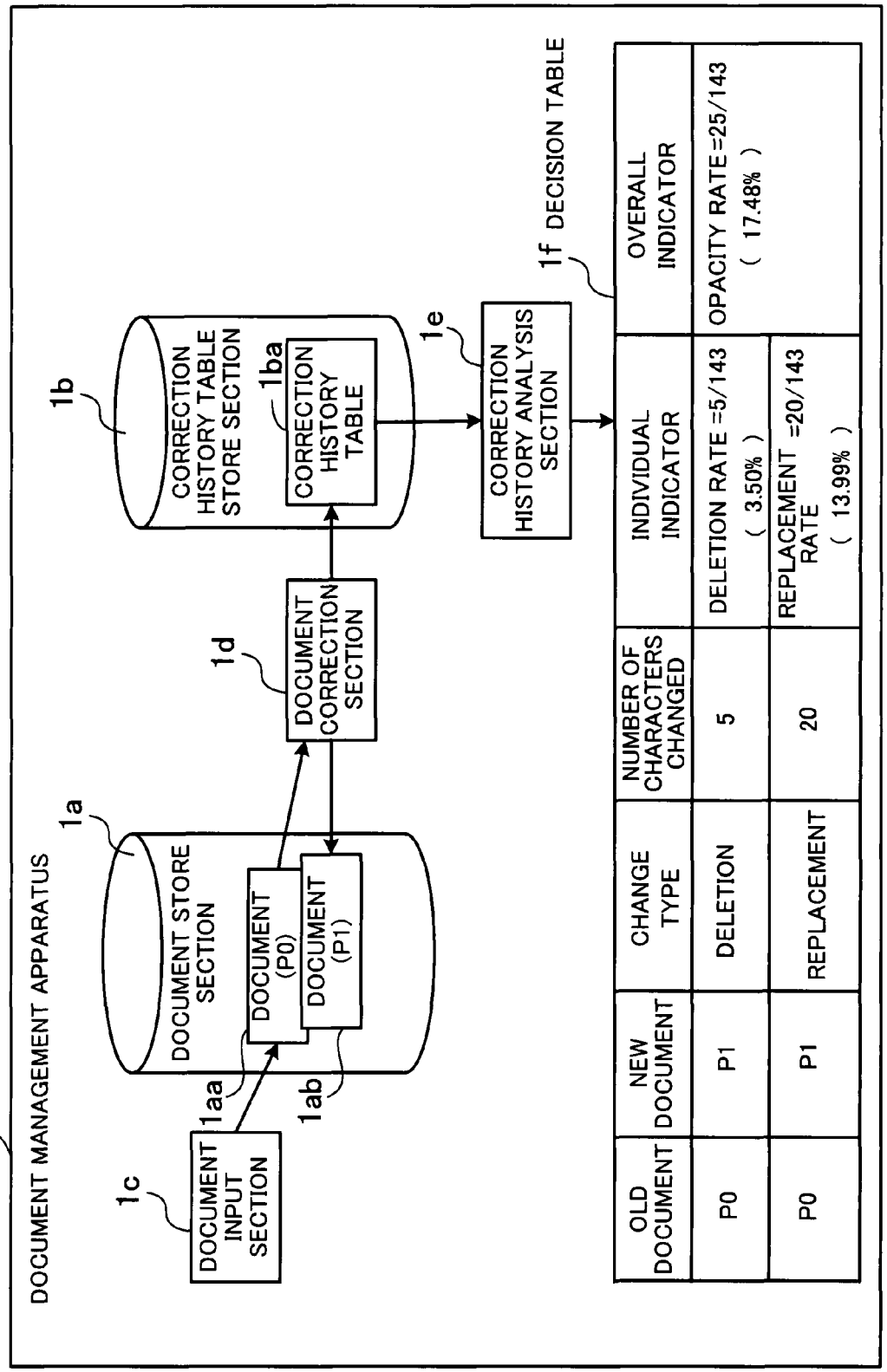
FIG. 1 is a view for giving an overview of the present invention.

FIG. 1 is a view for giving an overview of the present invention. A document management apparatus 1 comprises a document store section 1a, a correction history table store section 1b, a document input section 1c, a document correction section 1d, and a correction history analysis section 1e.

The document store section 1a stores documents 1aa and 1ab. In the example shown in FIG. 1, the document 1aa is original and the document 1ab is obtained by correcting the document 1aa.

The correction history table store section 1b stores a correction history table 1ba.

The document input section 1c accepts the original document 1aa inputted and stores the document 1aa inputted in the document store section 1a.

The document correction section 1d corrects a character string of the document 1aa stored in the document store section 1a in response to operation input and registers a correction history including the number of characters deleted by a character string deletion process and a correction history including the number of characters before replacement by a replacement process in a correction history table 1ba. In addition, the document correction section 1d stores the corrected document 1ab in the document store section 1a. The number of characters added by a correction process can also be registered in the correction history table 1ba as a correction history.

The correction history analysis section 1e refers to the correction history table 1ba, evaluates the transparency of information for the document 1aa, and calculates an evaluation value. The correction history analysis section 1e then makes a decision table 1f including the evaluation value.

An opacity rate, the degree of glorification, the degree of suppression, or the like is used as the evaluation value. An opacity rate calculated by the correction history analysis section 1e rises with an increase in the number of the characters deleted from the document 1aa or the number of the characters before the replacement by the replacement process. In addition, the degree of glorification calculated by the correction history analysis section 1e rises with an increase in the number of the characters added to the document 1aa or the number of the characters before the replacement by the replacement process. Furthermore, the degree of suppression calculated by the correction history analysis section 1e rises with an increase in the number of the characters deleted from the document 1aa.

With the document management apparatus 1 having the above structure, the original document 1aa is inputted and the document input section 1c stores the document 1aa in the document store section 1a. After that, the document correction section 1d corrects the character string of the document 1aa stored in the document store section 1a in response to the operation input, registers the correction history including the number of the characters deleted by the character string deletion process and the correction history including the number of the characters before the replacement by the replacement process in the correction history table 1ba, and stores the corrected document 1ab in the document store section 1a. The correction history analysis section 1e then makes the decision table 1f including the evaluation value such as the opacity rate.

As a result, information transparency in an organization can be judged on the basis of how the document was corrected. For example, a "fieldwork analysis note (analysis note)" in which a situation at a job site is objectively recorded in detail can be used as the document.

This analysis note is a record compiled by a fieldworker (observer) who is a third party, who observed the situation at the job site, and who had an interview. For example, in such an analysis note a third party concretely records how employees are working or transmitting information at a job site in a store or a factory. Problems and devices at a job site are enumerated in such an analysis note. A document, such as a job site improvement proposal document or a report of a trouble investigation, in which a fact at a job site is described can also be considered as the analysis note.

It is assumed that the fieldworker has shown his/her analysis note to a person whom the fieldworker observed and a person with whom the fieldworker had an interview to make sure that the contents of his/her analysis note are factual. In this case, the transparency of information in an organization can be estimated by measuring how many corrections are made at the time of reporting the analysis note to divisions other than the job site and high executives.

To be concrete, the person who prepared the original document registers the document 1aa in the document store section 1a of the document management apparatus 1 according to the present invention. A person who uses the document 1aa for making a report to be submitted to other divisions and high executives edits the document 1aa stored in the document store section 1a and makes the report. The document management apparatus 1 records an operation history indicative of what correction (deletion, addition, or replacement of a character string) is made in the original document 1aa in real time. The document management apparatus 1 can determine an opacity rate from the number of characters corrected, the type of the correction (deletion, addition, or replacement), and the like. It is also possible to totalize the degrees of corrections for the document 1aa stored in the document store section 1a according to period and field and to calculate the final transparency of the organization.

As a result, abuses (information transparency most of all) in the organization can be observed as making corrections in the analysis note, that is to say, as part of daily activities and be measured as a numeric value. Furthermore, unlike a questionnaire, a psychological interview, or the like which is special and expensive, measurement can be made at any time or at all times.

An embodiment of the present invention will now be described in detail.

Figure 2:
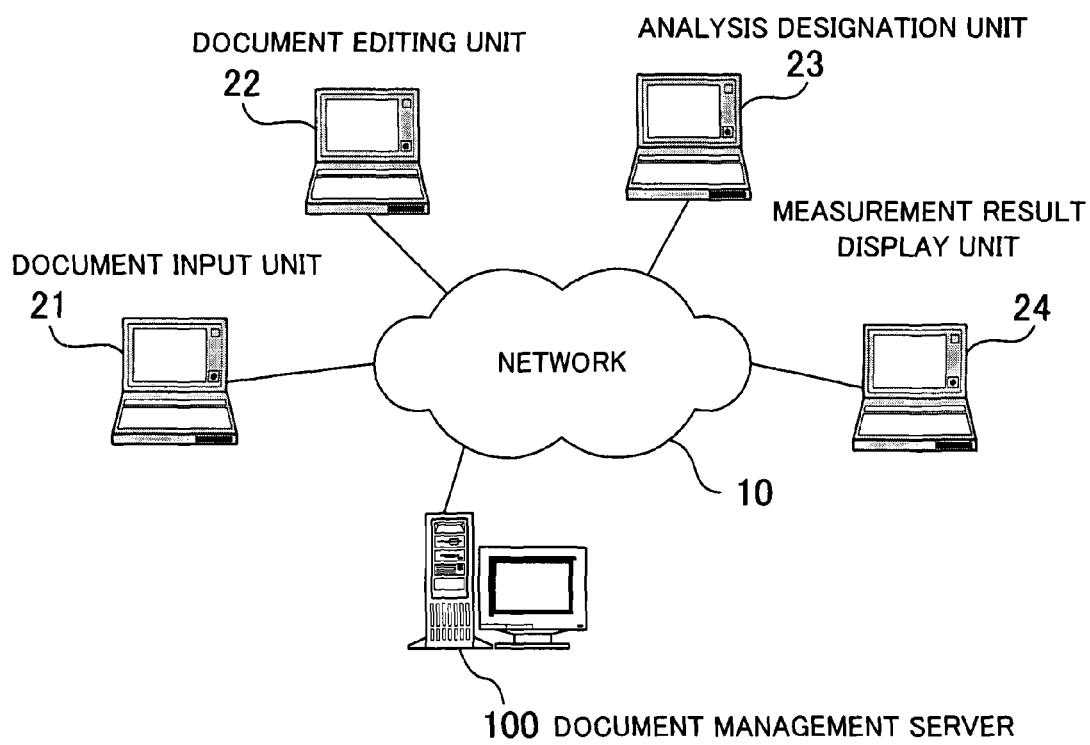
FIG. 2 is a view showing an example of the configuration of a system according to an embodiment of the present invention.

FIG. 2 is a view showing an example of the configuration of a system according to an embodiment of the present invention. A document input unit 21, a document editing unit 22, an analysis designation unit 23, and a measurement result display unit 24 are connected to a document management server 100 via a network 10. The document management server 100 is a computer used for monitoring how a document inputted from the document input unit 21 is updated and for indicating information transparency in an organization as a numeric value.

The document input unit 21 is a computer used for preparing a document in response to operation input from a user and for registering the document on the document management server 100. The document editing unit 22 is a computer used for making a correction in a document registered on the document management server 100 in response to operation input from the user. The analysis designation unit 23 is a computer used for giving the document management server 100 instructions to analyze information transparency on the basis of a document registered. The measurement result display unit 24 is a computer used for obtaining the measurement result of the information transparency from the document management server 100 and displaying it.

Figure 3:
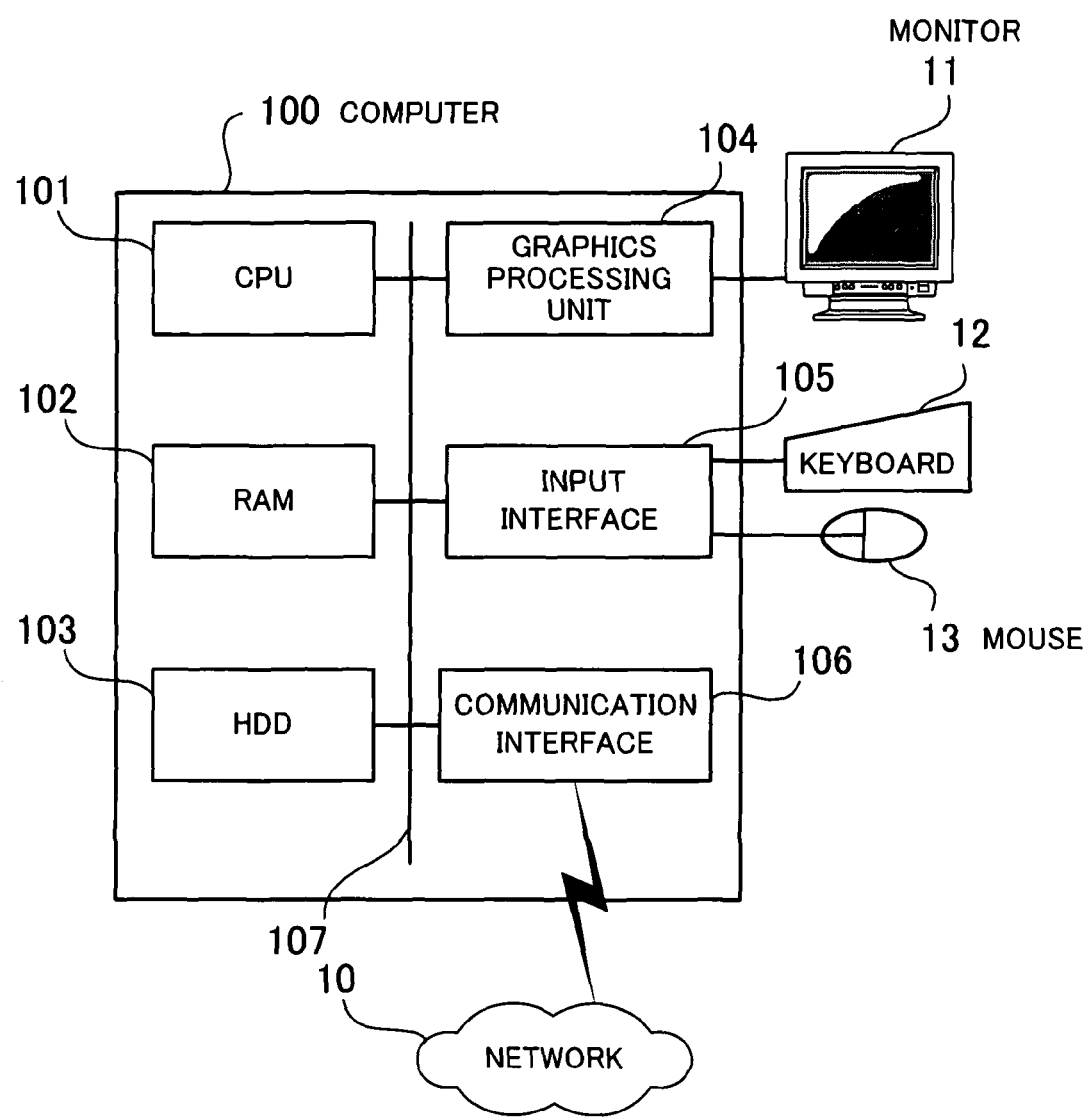
FIG. 3 is a view showing an example of the hardware configuration of a document management server used in the embodiment.

FIG. 3 is a view showing an example of the hardware configuration of the document management server used in this embodiment. The whole of the document management server 100 is controlled by a central processing unit (CPU) 101. A random access memory (RAM) 102, a hard disk drive (HDD) 103, a graphics processing unit 104, an input interface 105, and a communication interface 106 are connected to the CPU 101 via a bus 107.

The RAM 102 temporarily stores at least part of an operating system (OS) or an application program executed by the CPU 101. The RAM 102 also stores various pieces of data which the CPU 101 needs to perform a process. The HDD 103 stores the OS and application programs.

A monitor 11 is connected to the graphics processing unit 104. In accordance with instructions from the CPU 101, the graphics processing unit 104 displays an image on a screen of the monitor 11. A keyboard 12 and a mouse 13 are connected to the input interface 105. The input interface 105 sends a signal sent from the keyboard 12 or the mouse 13 to the CPU 101 via the bus 107.

The communication interface 106 is connected to a network 10. The communication interface 106 exchanges data with another computer via the network 10.

By adopting the above-mentioned hardware configuration, the processing function of this embodiment can be realized. FIG. 3 shows an example of the hardware configuration of the document management server 100. However, the document input unit 21, the document editing unit 22, the analysis designation unit 23, and the measurement result display unit 24 can also be realized by adopting the same hardware configuration.

Figure 4:
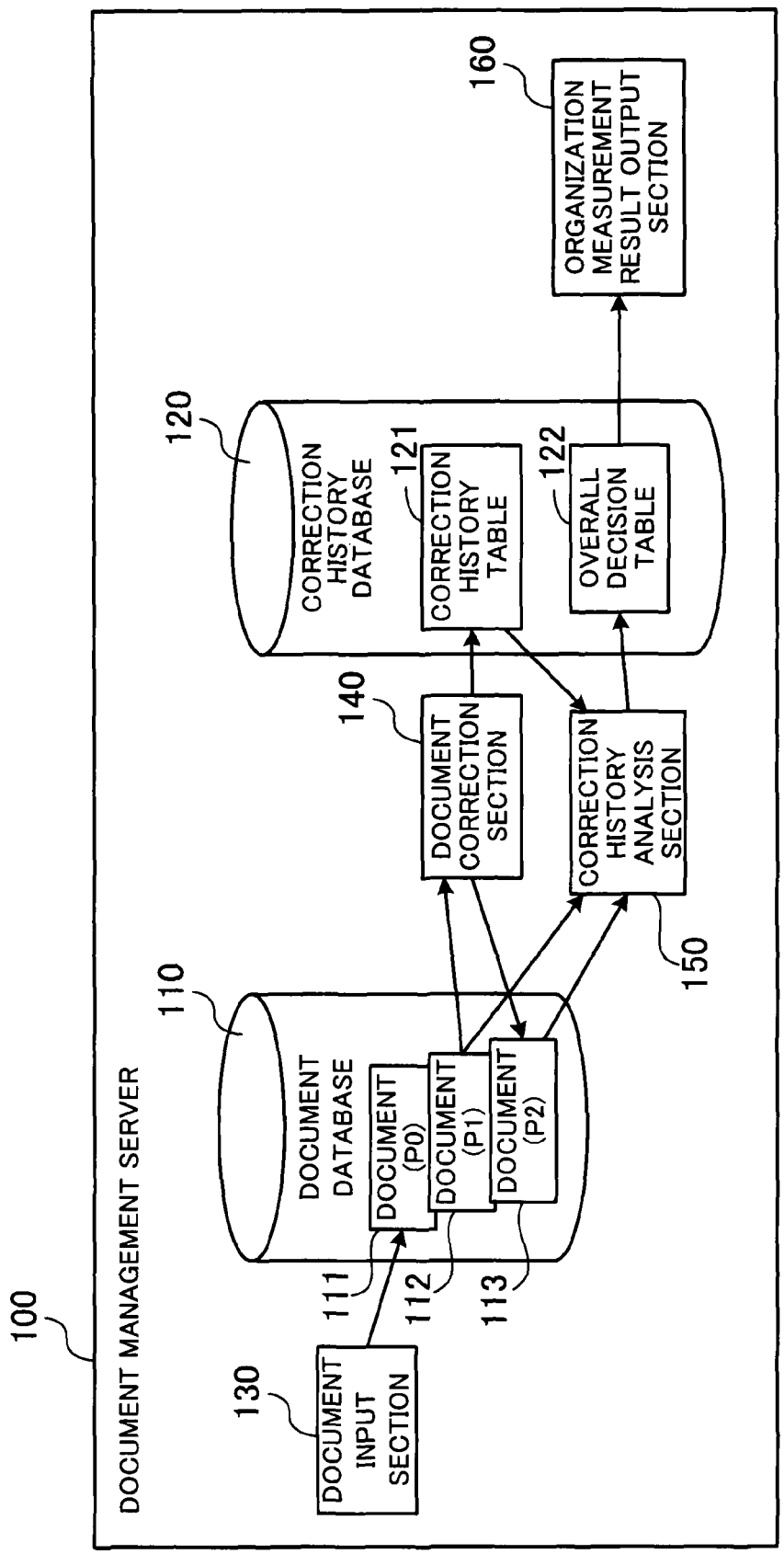
FIG. 4 is a block diagram showing the function of the document management server.

FIG. 4 is a block diagram showing the function of the document management server. The document management server 100 comprises a document database 110, a correction history database 120, a document input section 130, a document correction section 140, a correction history analysis section 150, and an organization measurement result output section 160.

In this embodiment, the document input section 130, the document correction section 140, the correction history analysis section 150, and the organization measurement result output section 160 are located in the document management server 100. However, the document input section 130, the document correction section 140, the correction history analysis section 150, and the organization measurement result output section 160 may be located in the document input unit 21, the document editing unit 22, the analysis designation unit 23, and the measurement result display unit 24 respectively. In this case, each of the document input section 130, the document correction section 140, the correction history analysis section 150, and the organization measurement result output section 160 has access to the document database 110 or the correction history database 120 via the network 10.

The document database 110 stores documents 111 through 113. The version numbers of the documents 111 through 113 are managed. That is to say, when the contents of the document 111 newly registered are changed and the document 112 in which a change has been made is registered, the document 112 is registered as another file. In this case, a version number, for example, is included in a file name. By doing so, another file name is given each time a document is updated. In the example shown in FIG. 4, the document 112 is obtained by making a change in the document 111 newly registered. The document 113 is obtained by making a change in the document 112.

The correction history database 120 stores a correction history of the documents 111 through 113. The correction history is stored as a correction history table 121 and an overall decision table 122. The correction history table 121 is a data table in which the correction history of the documents is recorded. The overall decision table 122 is a data table which indicates results obtained by measuring the information transparency in the organization on the basis of the correction history.

The document input section 130 stores the new document 111 in the document database 110 in accordance with instructions from the document input unit 21. For example, the document 111 prepared by the use of a word processor on the document input unit 21 is passed to the document input section 130 and the document input section 130 stores the document 111 in the document database 110.

The document correction section 140 makes a correction in a document (document 112, in the example shown in FIG. 4) registered in the document database 110 in accordance with operation input provided by a user via the document editing unit 22. A character string is deleted, added, or changed to correct the document 112. The document correction section 140 stores the document 113 obtained by making the correction in the document 112 in the document database 110 as a file different from the document 112. When the document correction section 140 stores the document 113 obtained by making the correction in the document 112 in the document database 110, the document correction section 140 gives the document 113 a file name different from the file name of the document 112. For example, the document correction section 140 adds a numeric value indicative of the version number of the document 113 to the end of the file name of the document 112.

In addition, each time operation input is provided to make a correction in a document, the document correction section 140 registers the contents of the correction in the correction history table 121. At this time the document correction section 140 obtains the user name of a user who provides the operation input to make the correction in the document from the document editing unit 22 and registers the contents of the correction associated with the user name in the correction history table 121.

When the correction history analysis section 150 receives instructions from the analysis designation unit 23 to make an analysis, the correction history analysis section 150 refers to the correction history table 121 and measures the information transparency in the organization. The transparency of a document updated is indicated by a numeric value as an opacity rate. The greater the value of an opacity rate grows, the lower the information transparency in the organization becomes.

Information transparency from the time when a document is newly registered to the time when the document goes into the latest state is indicated by a total opacity rate, the degree of glorification, or the degree of suppression. A total opacity rate indicates the ratio of characters deleted or replaced to information included in the document 111 initially registered. The degree of suppression indicates the ratio of characters deleted. The degree of glorification indicates the degree of characters replaced.

In response to a request from the measurement result display unit 24 to acquire measurement results, the organization measurement result output section 160 reads out the overall decision table 122 from the correction history database 120 and sends it to the measurement result display unit 24. As a result, the overall decision table 122 is displayed on the measurement result display unit 24.

The transparency of the organization can be indicated by a numeric value by the use of the above system. A procedure for measuring transparency will now be described with reference to concrete examples of a correction made in a document.

An example of a correction made in a document will be described first with reference to FIGS. 5 through 7. In FIGS. 6 and 7, corrections are underlined.

FIG. 5 is a view showing an example of a document newly registered. The original document 111 is prepared as the proceedings of a meeting for discussions about a complaint received from a customer. The fact that the complaint was received from the customer and a superior's instructions concerning the complaint are stated in the document 111.

FIG. 6 is a view showing the result of a first correction made in the document. The document 112 is prepared as a report to be submitted to Mr./Ms. B who is a section chief by Mr./Ms. A who is the person in charge on the basis of the document 111. In this example, the name of the customer is deleted and the contents of Mr./Ms. B's instructions concerning the complaint are changed to an equivocal expression.

FIG. 7 is a view showing the result of a second correction made in the document. The document 113 is prepared as a report to be submitted to Mr./Ms. C who is a department chief by Mr./Ms. B who is a section chief on the basis of the document 112. In this example, the word "complaint" is changed to the word "opinion" and a negative meaning is eliminated. In addition, the expression which means that Mr./Ms. A should leave the complaint to chance is changed to the expression which means that Mr./Ms. A should positively meet the complaint.

When the document is changed in this way, Mr./Ms. C who is a department chief cannot foresee the occurrence of a problem caused by, for example, a delay in meeting the complaint.

If such a correction is always made in a document, only reports to the effect that the business is being carried out favorably reach members of the management, such as Mr./Ms. C who is a department chief. As a result, when high executives in the organization notice that customers were poorly treated, customers may have lost confidence in the whole of the organization.

Therefore, the document management server 100 evaluates information transparency in the organization through the following procedure.

Figure 8:
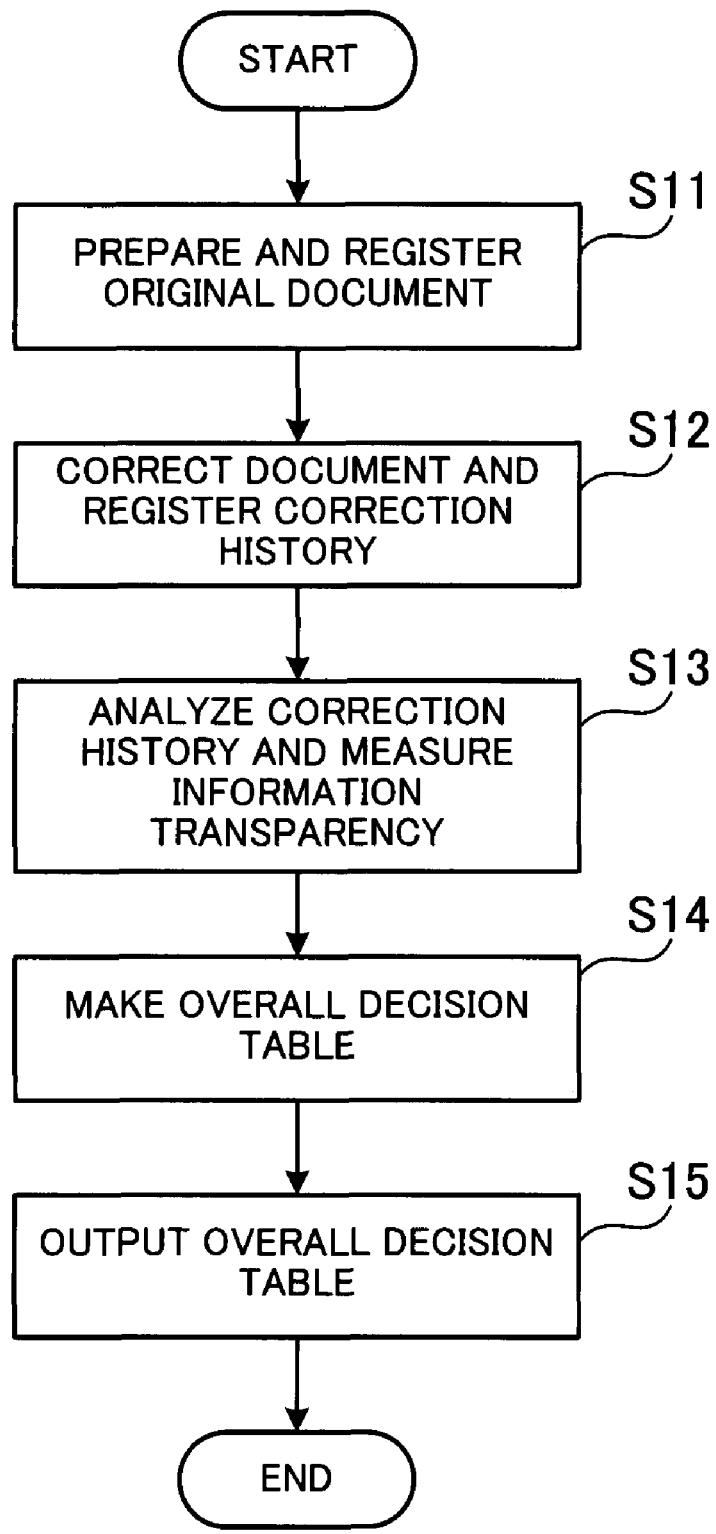
FIG. 8 is a flow chart showing a procedure for evaluating information transparency in an organization.

FIG. 8 is a flow chart showing a procedure for evaluating information transparency in the organization. The process shown in FIG. 8 will now be described in order of step number.

[Step S11] The document input section 130 receives the original document 111 prepared by the document input unit 21 and registers the document 111 in the document database 110.

[Step S12] The document correction section 140 sends the contents of the document 111 or 112 in the document database 110 to the document editing unit 22 in response to a request from the document editing unit 22 to acquire the document. When the document correction section 140 receives instructions from the document editing unit 22 to delete, add, or replace characters included in a document, the document correction section 140 corrects the document in accordance with the instructions. At this time the document correction section 140 registers a correction history in the correction history table 121. If characters are added at a position where characters are deleted, the document correction section 140 determines that character replacement is performed at the position.

[Step S13] When the correction history analysis section 150 receives instructions from the analysis designation unit 23 to make an analysis, the correction history analysis section 150 analyzes the correction history registered in the correction history table 121 and measures information transparency in the organization.

[Step S14] The correction history analysis section 150 makes the overall decision table 122 on the basis of measurement results and stores the overall decision table 122 in the correction history database 120.

[Step S15] In response to a request from the measurement result display unit 24 to acquire measurement results, the organization measurement result output section 160 reads out the overall decision table 122 from the correction history database 120 and sends it to the measurement result display unit 24.

Next, a method for correcting a document and making a correction history will be described in detail.

Figure 9:
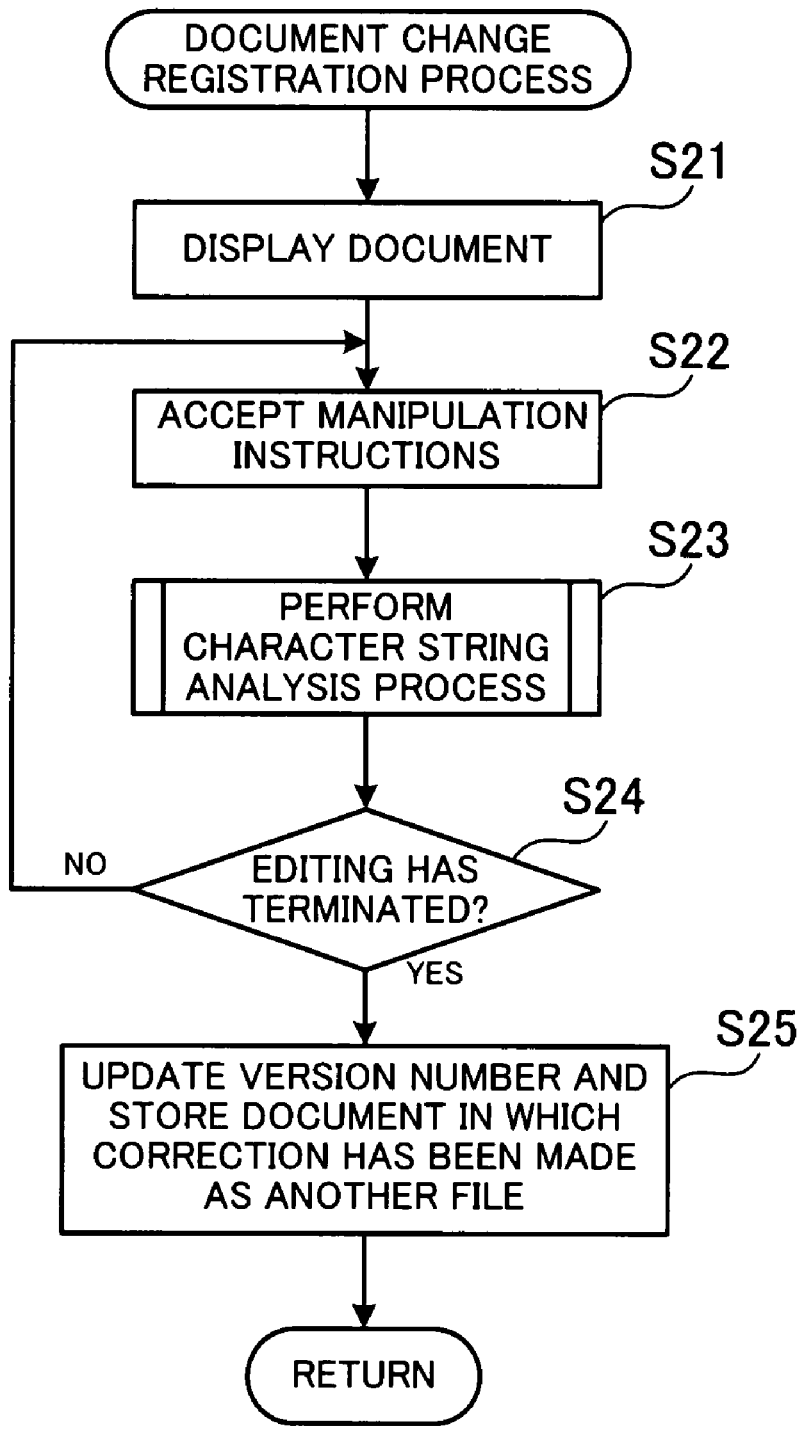
FIG. 9 is a flow chart showing a procedure for a document change registration process.

FIG. 9 is a flow chart showing a procedure for a document change registration process. The process shown in FIG. 9 will now be described in order of step number.

[Step S21] The document correction section 140 sends the contents of the document to the document editing unit 22 and makes the document editing unit 22 display the contents of the document on its screen.

[Step S22] The document correction section 140 accepts instructions to handle a character string that are based on operation input which a user provides to the document editing unit 22.

[Step S23] The document correction section 140 performs a character string analysis process. This process will be described later in detail.

[Step S24] The document correction section 140 determines whether editing performed by the document editing unit 22 has terminated. To be concrete, when the document correction section 140 receives notice of the termination of document editing from the document editing unit 22, the document correction section 140 determines that a document correction has terminated. If the editing has terminated, then step S25 is performed. If the editing has not terminated, then step S22 is performed.

[Step S25] The document correction section 140 stores the document in which the correction has been made in the document database 110 as a new file. In this case, the document correction section 140 updates (increments) a version number included in a file name. The process then terminates.

The character string analysis process will now be described in detail.

Figure 10:
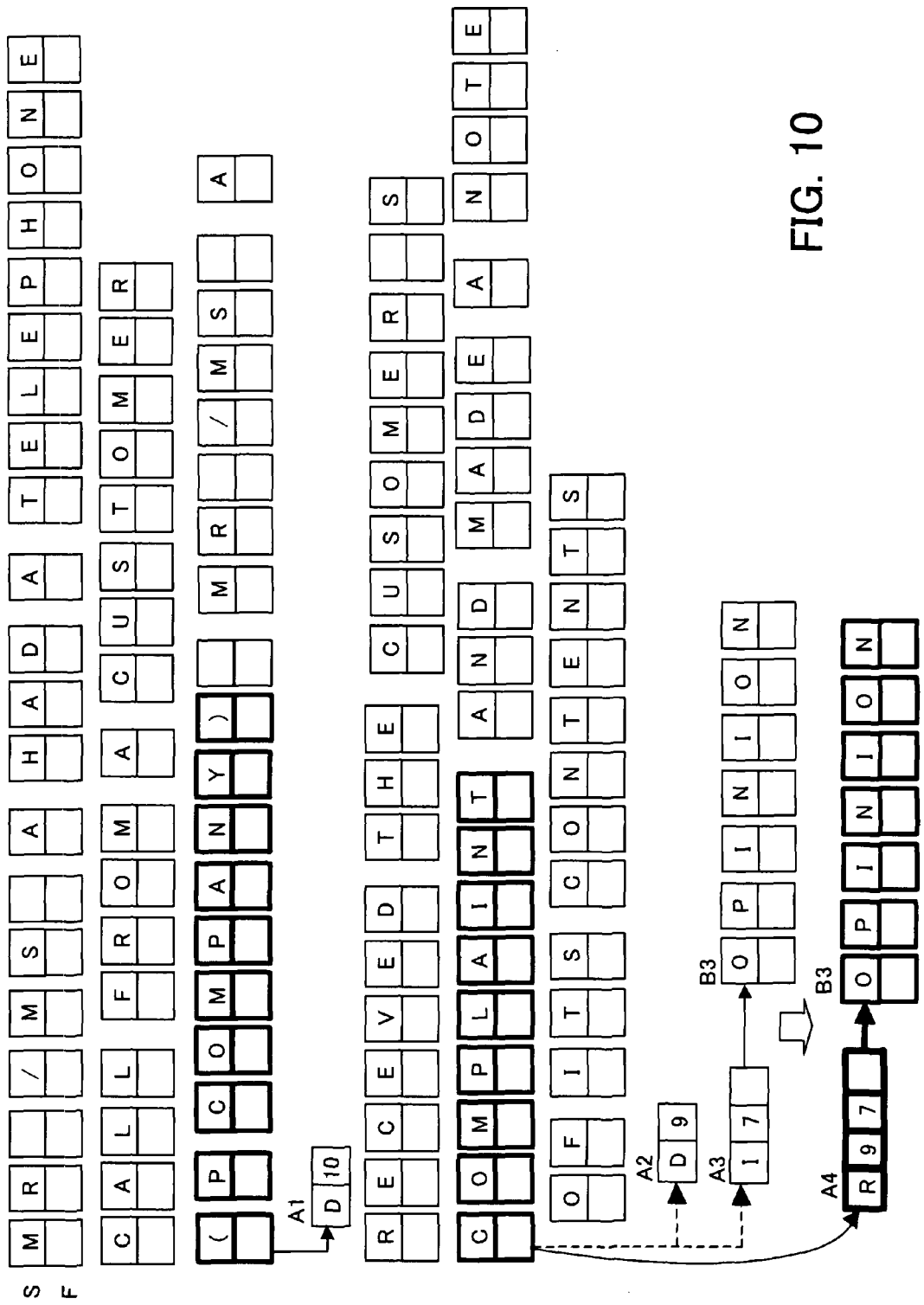
FIG. 10 is a view for giving an overview of a character string analysis process.

FIG. 10 is a view for giving an overview of the character string analysis process. In this example, the character string "Mr./Ms. A had a telephone call from a customer (P company). Mr./Ms. A received the customer's complaint and made a note of its contents" is handled. The character string of the document is managed by an array S and a flag F set for each character. The flag F is a link with information indicative of the contents of a correction (place information indicative of a place where processing information is stored). An ith (i is a natural number indicative of the order of a character) character in the document is expressed as S[i] and a flag of the character is expressed as F[i].

When a manipulation (deletion, replacement, or addition) is performed on a character string including one or more characters according to operation input to the document editing unit 22, a link with the result of the character string manipulation is set for a flag F of a leading character.

If the manipulation of deletion is performed, then the sign "D" indicative of deletion and a numeric value indicative of the number of characters deleted are set at a link destination indicated by the flag F.

If the manipulation of addition is performed, then the sign "I" indicative of addition, a numeric value indicative of the number of characters added, and a link with a character string added are set for the flag F. The character string added is set at a position indicated by the link with the character string added.

If the manipulation of replacement is performed, then the sign "R" indicative of replacement, a numeric value indicative of the number of characters before the replacement, a numeric value indicative of the number of characters after the replacement, and a link with a character string after the replacement are set at a link destination indicated by the flag F. The character string after the replacement is set at a position indicated by the link with the character string after the replacement.

In the example shown in FIG. 10, the following three manipulations are performed in order.

The ten characters of "(P company)" are deleted in a first manipulation. The nine characters of "complaint" are deleted in a second manipulation. After that, the seven characters of "opinion" are added at the place where the nine characters of "complaint" were as a third manipulation.

The following processing information is set in the document as a result of these manipulations.

A link "A1" is set for a flag F[39] of a thirty-ninth character. The sign "D" and the numeric value "10" are set at a position indicated by "A1". These pieces of processing information are expressed as F[39]=A1('D',10) which indicates that the ten characters from the thirty-ninth character are deleted (D).

Links "A2" and "A3" are set at a seventy-ninth character. The sign "D" and the number "9" of characters are set at a position indicated by "A2". The sign "I," the number "7" of characters, and a link "B3" are set at a position indicated by "A3". These pieces of processing information are expressed as F[79]=A2('D',9),A3('I',7,B3). The character string "opinion" is set at a position indicated by the link "B3".

Each link also includes information (not shown) regarding the time when a correction indicated thereby was made.

By the way, the same result that is obtained by the second and third manipulations can be attained by the manipulation of replacing "complaint" by "opinion". In this embodiment, deletion is differentiated from replacement when information transparency in the organization is calculated. That is to say, if a character string is added after the deletion of a character string, this must be recognized as replacement in the character string analysis process. In the example shown in FIG. 10, not "deletion of nineteen characters and addition of seven characters" but "deletion of ten characters and replacement of nine characters" must be recorded in a correction history.

Figure 11:
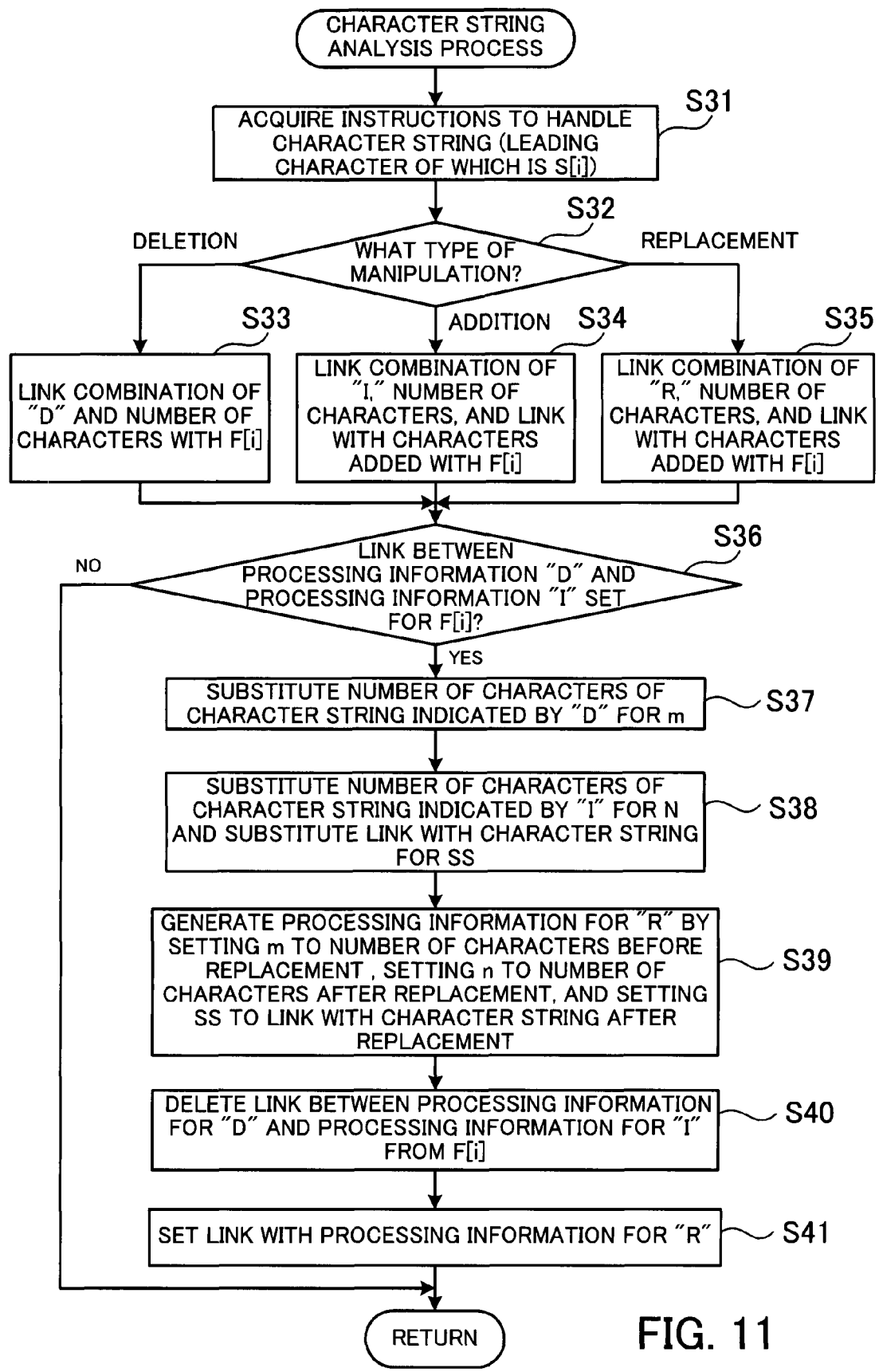
FIG. 11 is a flow chart showing a procedure for the character string analysis process.

FIG. 11 is a flow chart showing a procedure for the character string analysis process. The process shown in FIG. 11 will now be described in order of step number.

[Step S31] The document correction section 140 acquires instructions to handle the character string. At this time the document correction section 140 acquires the order "i" in the document of the leading character S[i] of the character string to be handled.

[Step S32] The document correction section 140 determines a manipulation type. A manipulation type is deletion, addition, or replacement. For example, if a character string is not selected and the backspace key is pressed, then the document correction section 140 recognizes that the manipulation of deleting a character which is ahead of the position of a cursor is performed. If a character string is not selected and the delete key is pressed, then the document correction section 140 recognizes that the manipulation of deleting a character behind the position of a cursor is performed. If the backspace key or the delete key is pressed in a state in which a character string is selected, then the document correction section 140 recognizes that the manipulation of deleting the selected character string is performed.

If a character string is not selected, characters are inputted, and a Japanese conversion is decided, then the document correction section 140 determines that the manipulation of adding a decided character string at the position of a cursor is performed. If input of characters and the decision of a Japanese conversion are performed in a state in which a character string is selected, then the document correction section 140 determines that the manipulation of replacing the selected character string by a decided character string is performed.

If a manipulation type is deletion, then step S33 is performed. If a manipulation type is addition, then step S34 is performed. If a manipulation type is replacement, then step S35 is performed.

[Step S33] When the manipulation of deletion is performed, the document correction section 140 links a combination of the sign "D" and the number of characters included in a character string deleted with F[i]. Step S36 is then performed.

[Step S34] When the manipulation of addition is performed, the document correction section 140 links a combination of the sign "I," the number of characters included in a character string added, and a link with the characters added with F[i]. Step S36 is then performed.

[Step S35] When the manipulation of replacement is performed, the document correction section 140 links a combination of the sign "R," the number of characters of a character string before the replacement, the number of characters of a character string after the replacement, and a link with characters added with F[i]. Step S36 is then performed.

[Step S36] The document correction section 140 determines whether a link between processing information for deletion "D" and processing information for addition "I" performed after the deletion is set for F[i]. The order of processing time corresponding to the pieces of processing information can be determined by referring to correction time. If there is an appropriate link, then step S37 is performed. If there is no appropriate link, then the process terminates.

[Step S37] The document correction section 140 substitutes the number of characters of a character string indicated by the processing information for deletion "D" for a variable m (natural number).

[Step S38] The document correction section 140 substitutes the number of characters of a character string indicated by the processing information for addition "I" for a variable n (natural number). In addition, the document correction section 140 substitutes a link with the character string added for a variable SS.

[Step S39] The document correction section 140 generates processing information for replacement "R" by setting m to the number of characters before replacement, setting n to the number of characters after the replacement, and setting SS to a link with a character string after the replacement.

[Step S40] The document correction section 140 deletes the link between the processing information for deletion "D" and the processing information for addition "I" from F[i].

[Step S41] The document correction section 140 sets a link with the processing information generated in step S39 for F[i]. The process then terminates.

A combination of the deletion and the addition can be replaced in this way by the replacement.

At the seventy-ninth character in the example shown in FIG. 10, for example, the new character string "opinion" is added after the character string "complaint" is deleted. The deletion history A2('D',9) is already linked with the flag F[79] of the seventy-ninth character. The addition history A3('I',7,B3) is newly linked by the character addition process.

At this time the two histories "D" and "I" are linked with F[79]. Therefore, the document correction section 140 determines in step S36 that a link between processing information for deletion "D" and processing information for addition "I" performed after the deletion is set for F[i]. As a result, a process (steps S37 through S41) for integrating the deletion and the addition into the replacement is performed.

In the integration process, the processing information for the deletion indicated by the link A2 and the processing information for the addition indicated by the link A3 are integrated. Processing information for the replacement of "replacing the nine characters by the seven characters" is generated and is associated with the seventy-ninth character by a link A4. The processing information for the deletion indicated by the link A2 and the processing information for the addition indicated by the link A3 are deleted. In this example, the processing information for the replacement indicated by the link A4 is ('R',m=9,n=7,SS=B3).

A character string manipulation may repeatedly be performed on the same portion. For example, the manipulation of deletion, addition, or replacement may be performed on the character string after the replacement indicated by a link B3. In this case, the character string analysis process shown in FIG. 11 is repeatedly performed on the link B3 recursively.

After all the character string manipulations end, the correction histories can be collected by retrieving processing information linked with a flag F[i] of a character S[i]. The correction history table 121 is made by using the collected correction histories.

Figure 12:
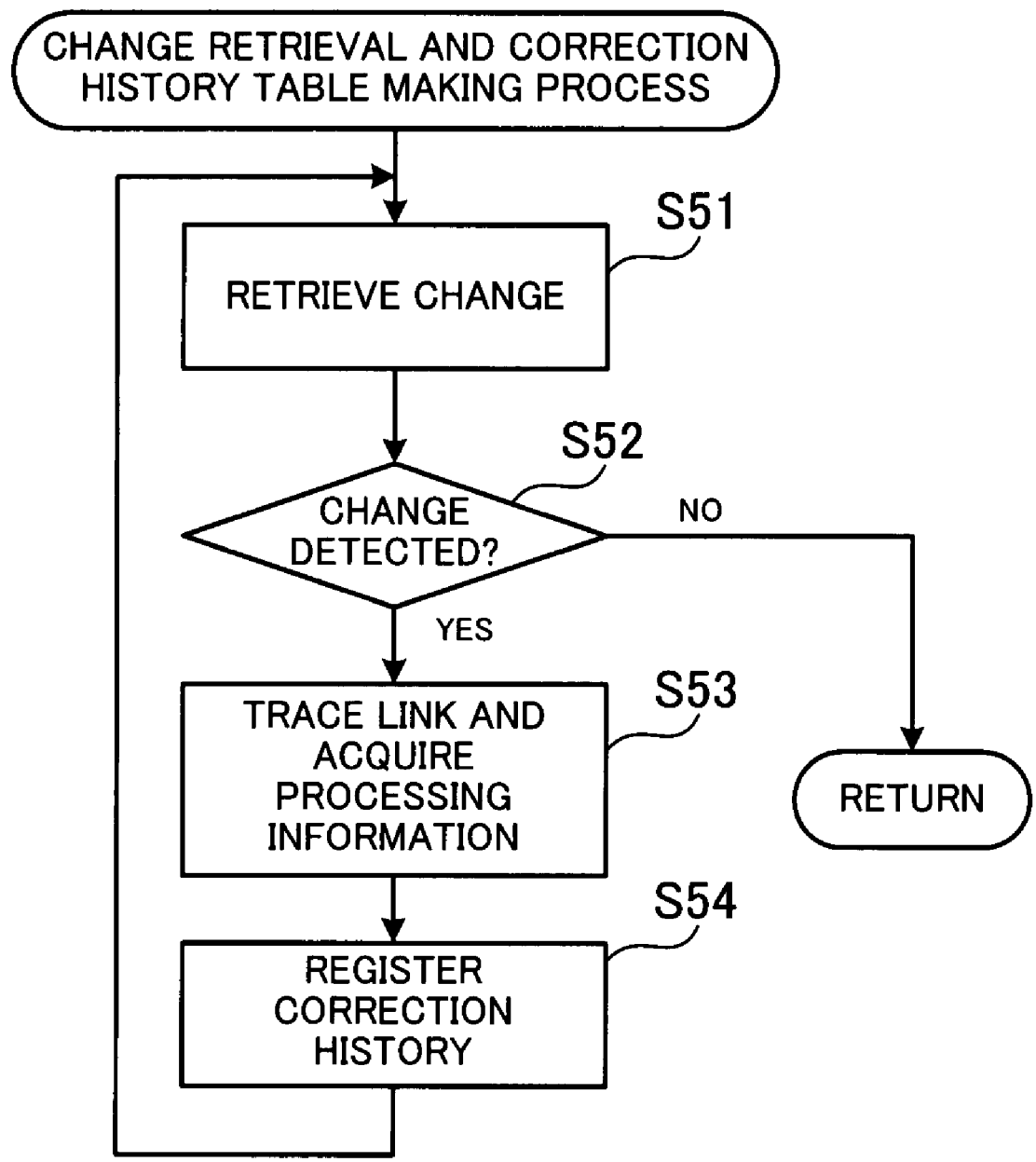
FIG. 12 is a flow chart showing a procedure for a change retrieval and correction history table making process.

FIG. 12 is a flow chart showing a procedure for a change retrieval and correction history table making process. The process shown in FIG. 12 will now be described in order of step number.

[Step S51] The document correction section 140 retrieves a change from a corrected document. To be concrete, the document correction section 140 refers to character strings included in a document from the beginning and retrieves a character for a flag F of which a link is set.

[Step S52] The document correction section 140 determines whether a change is detected. If a change is detected, then step S53 is performed. If a change is not detected, then the process terminates.

[Step S53] The document correction section 140 traces a link set for a flag F of a character detected and acquires processing information.

[Step S54] The document correction section 140 registers a processing history in the correction history table 121 on the basis of the processing information it acquired. Step S51 is then performed.

FIG. 13 is a view showing an example of the data structure of the correction history table. The correction history table 121 includes Corrector, Correction Time, Old Document, New Document, Correction Type, Starting Point, Character String Length, and Object Character String columns.

The name of a user who provided operation input for giving instructions to make a correction is set in the Corrector column. The name can be acquired from the document editing unit 22. The time when the correction was made in a document is set in the Correction Time column. Identification information (such as a path and a file name) for the document in which the correction was made is set in the Old Document column. Identification information for a document after the correction is set in the New Document. The type of a correction manipulation (deletion, addition, or replacement) is set in the Correction Type column. A numeric value indicative of where the leading character of a character string to be corrected is from the head of a document is set in the Starting Point column. The number of characters included in the character string to be corrected is set in the Character String Length. If the type of a correction manipulation is replacement, then the number of characters of a character string before replacement is set in the Character String Length. A corrected character string is set in the Object Character String column.

Information transparency in the organization is decided on the basis of the correction history table 121 having the above data structure. The overall decision table 122 is made on the basis of a decision result.

Figure 14:
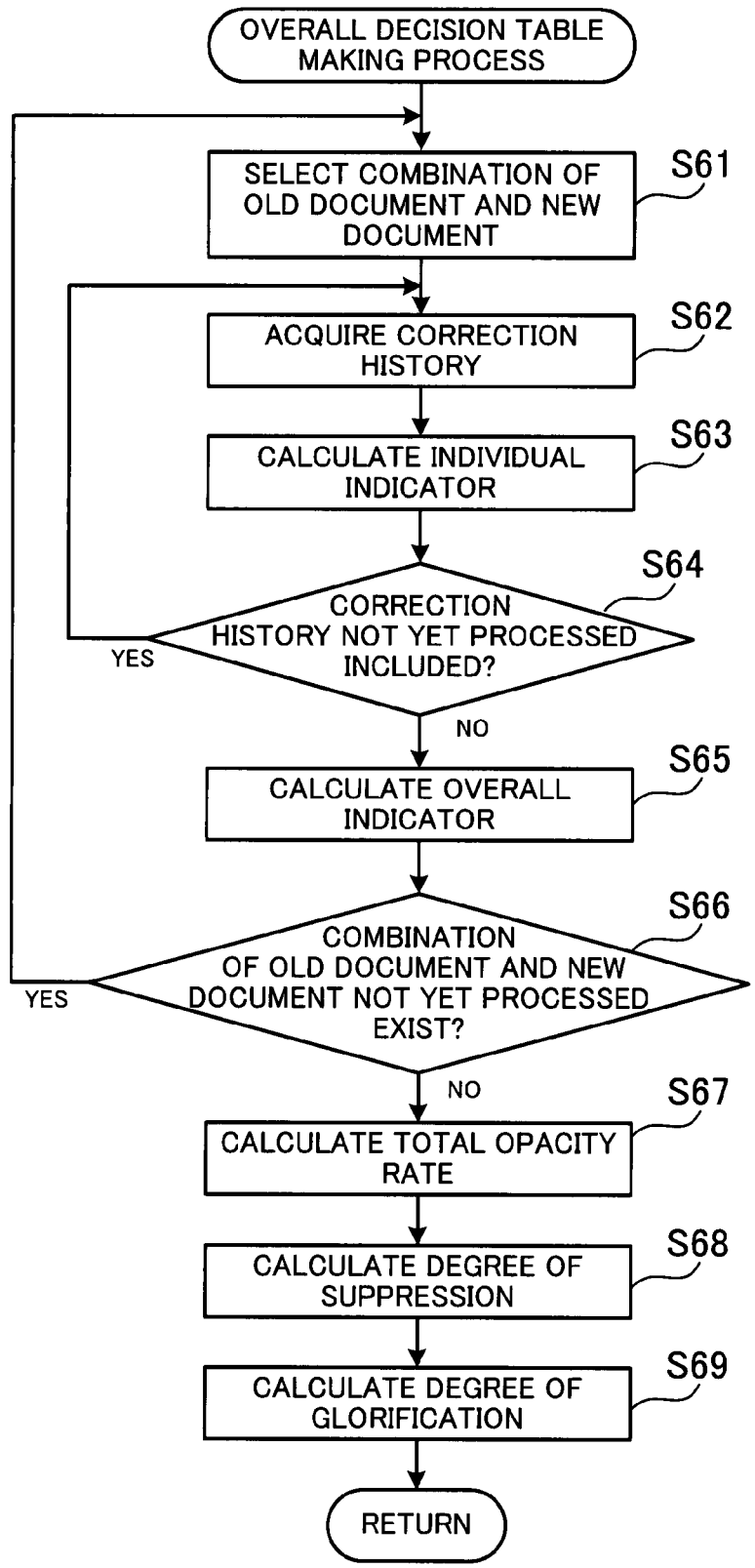
FIG. 14 is a flow chart showing a procedure for an overall decision table making process.

FIG. 14 is a flow chart showing a procedure for the overall decision table making process. The process shown in FIG. 14 will now be described in order of step number.

[Step S61] The correction history analysis section 150 refers to the Old Document and New Document columns included in the correction history table 121 and selects a combination of an old document and a new document which is not yet processed.

[Step S62] The correction history analysis section 150 acquires one of correction histories which relate to the combination of the old document and the new document selected in step S61 and which are not yet processed from the correction history table 121.

[Step S63] The correction history analysis section 150 calculates an individual indicator on the basis of the correction history selected in step S62. The individual indicator is a numeric value indicative of an influence which a process indicated by the correction history exercises on the information transparency of the entire document. If a character string was deleted, then a deletion rate is calculated as the individual indicator. If a character string was replaced, then a replacement rate is calculated as the individual indicator. If a character string was added, then an addition rate is calculated as the individual indicator. The correction history analysis section 150 then registers the calculated value of the individual indicator in the overall decision table 122.

[Step S64] The correction history analysis section 150 determines whether a correction history which is not yet processed is included in the correction histories relating to the combination of the old document and the new document selected in step S61. If a correction history which is not yet processed is included, then step S62 is performed. If a correction history which is not yet processed is not included, then step S65 is performed.

[Step S65] The correction history analysis section 150 calculates an overall indicator regarding the combination of the old document and the new document selected in step S61. The overall indicator is the rate of information opacity caused by a correction made in the entire document, and is calculated on the basis of the number of characters changed in each correction history. The correction history analysis section 150 then resisters the overall indicator calculated in the overall decision table 122.

[Step S66] The correction history analysis section 150 determines whether there is a combination of an old document and a new document not yet processed. If there is a combination of an old document and a new document not yet processed, then step S61 is performed. If there is no combination of an old document and a new document not yet processed, then step S67 is performed.

[Step S67] The correction history analysis section 150 calculates an information opacity rate (total opacity rate) from the time when a document is prepared to the time when a final correction is made. A total opacity rate is represented by a numeric value indicative of how old information is obscured, and is calculated on the basis of an overall indicator regarding a combination of an old document and a new document. The correction history analysis section 150 then resisters the total opacity rate calculated in the overall decision table 122.

[Step S68] The correction history analysis section 150 calculates the degree of information suppression from the time when the document is prepared to the time when the final correction is made. The degree of suppression is represented by a numeric value indicative of how information is suppressed, and is calculated on the basis of a deletion rate which is an individual indicator. The correction history analysis section 150 then resisters the degree of suppression calculated in the overall decision table 122.

[Step S69] The correction history analysis section 150 calculates the degree of information glorification from the time when the document is prepared to the time when the final correction is made. The degree of glorification is represented by a numeric value indicative of how many corrections were made with positive intent, such as with intent to make the document readable, and is calculated on the basis of a replacement rate which is an individual indicator. The correction history analysis section 150 then resisters the degree of glorification calculated in the overall decision table 122. After that, the process terminates.

FIG. 15 is a view showing an example of the data structure of the overall decision table. The overall decision table 122 includes Old Document, New Document, Update Type, Number of Characters Changed, Individual Indicator, and Overall Indicator columns.

Identification information (such as a path and a file name) for a document before a correction indicated by each piece of processing information is set in the Old Document column. Identification information for a document after a correction indicated by each piece of processing information is set in the New Document column. A process type (deletion, addition, or replacement) indicated by each piece of processing information is set in the Update Type column. The number of characters included in a character string to be corrected in a process indicated by each piece of processing information is set in the Number of Characters Changed column. If the process is replacement, then the number of characters included in a character string before replacement is set in the Number of Characters Changed column. If the process is addition, then the number of characters added is set in the Number of Characters Changed column.

An influence which a process indicated by each piece of processing information exercises on the transparency of the entire document is set in the Individual Indicator column as a numeric value. If a deletion process is performed, a deletion rate is calculated. A deletion rate is obtained by dividing the number of characters deleted by the number of characters included in a document before the correction. In the example shown in FIG. 15, a deletion rate is shown in a percentage. If a replacement process is performed, a replacement rate is calculated. A replacement rate is obtained by dividing the number of characters before replacement by the number of characters included in a document before the correction. In the example shown in FIG. 15, replacement rates are shown in percentages.

In the example shown in FIG. 15, an addition process is not included. If an addition process is performed, an addition rate is calculated. An addition rate is obtained by dividing the number of characters added by the number of characters included in a document before the correction.

An opacity rate for each combination of an old document and a new document is set in the Overall Indicator column. An opacity rate is obtained by dividing the total number of characters changed in a process corresponding to each combination by the number of characters included in an old document. In the example shown in FIG. 15, opacity rates are shown in percentages.

In addition to the above columns, a total opacity rate, the degree of suppression and the degree of glorification are set in the overall decision table 122 as numeric values.

A total opacity rate is obtained by dividing the total number of characters changed in processes indicated in all correction histories by the total number of characters included in all documents ("P0" and "P1" in the example shown in FIG. 15) set in the Old Document column. In the example shown in FIG. 15, a total opacity rate is shown in a percentage.

The degree of suppression is obtained by dividing the total number of characters changed in all deletion processes by the total number of characters included in all documents ("P0" and "P1" in the example shown in FIG. 15) set in the Old Document column. In the example shown in FIG. 15, the degree of suppression is shown in a percentage.

The degree of glorification is obtained by dividing the total number of characters changed in all replacement processes and all addition processes by the total number of characters included in all documents ("P0" and "P1" in the example shown in FIG. 15) set in the Old Document column. In the example shown in FIG. 15, the degree of glorification is shown in a percentage. In the example shown in FIG. 15, an addition process is not included, so the degree of glorification is calculated only on the basis of replacement processes.

As has been described, document correction which is a part of daily activities is observed and abuses (information transparency most of all) in an organization can be measured as a numeric value. Furthermore, unlike a questionnaire, a psychological interview, or the like which is special and expensive, determination can be made at any time or at all times.

Second Embodiment

When an overall decision table is made from a correction history table in a second embodiment, an evaluation correspondence table is referred to and weighting is performed on each of deletion, addition, and replacement processes. In addition, in the second embodiment a person who prepares an original document can place mark information on an important passage in a document. If the important passage on which the mark information is placed is corrected, then the degree of the opacity of information is judged to be high.

Figure 16:
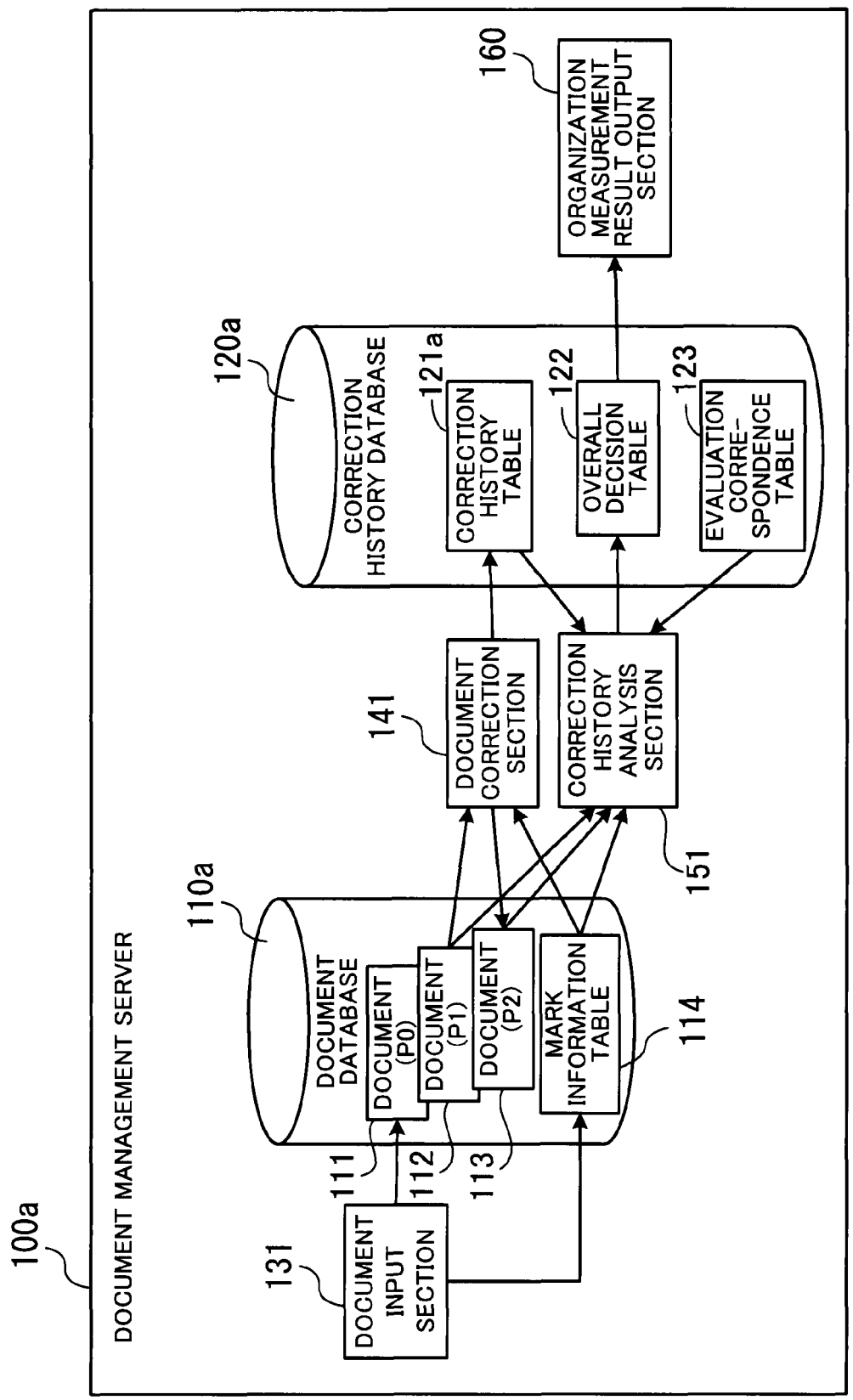
FIG. 16 is a block diagram showing the function of a document management server according to a second embodiment of the present invention.

FIG. 16 is a block diagram showing the function of a document management server according to the second embodiment of the present invention. Components which are shown in FIG. 16 and which have the same functions as those of the first embodiment of the present invention are marked with the same symbols and descriptions of them will be omitted. The differences between the document management servers according to the first and second embodiments of the present invention will now be described.

With a document management server 100*a* according to the second embodiment of the present invention, not only documents 111 through 113 but also a mark information table 114 is stored in a document database 110*a*. The mark information table 114 is a data table in which mark information for specifying a character string designated as an important passage by a person that prepared the document 111 is registered.

In addition to a correction history table 121*a* and an overall decision table 122, an evaluation correspondence table 123 is stored in a correction history database 120*a*. With the correction history table 121*a*, information regarding a correction made in the important passage indicated by the mark information is added to the correction history table 121 shown in the first embodiment of the present invention. The degree of an influence which each of a deletion process, an addition process, and a replacement process exercises on information transparency is designated by weight in the evaluation correspondence table 123. The evaluation correspondence table 123 is made by a manager before the operation of the document management server 100*a* is begun.

A document input section 131 stores the document 111 inputted from the document input unit 21 in the document database 110*a* and registers a character string designated as an important passage by a person who prepared the document 111 in the mark information table 114.

On the basis of processing information for the documents 111 through 113, a document correction section 141 generates correction histories and registers them in the correction history table 121*a*. In addition, the document correction section 141 refers to the mark information table 114 and registers how the important passage is corrected in the correction history table 121*a*.

When a correction history analysis section 151 makes the overall decision table 122, the correction history analysis section 151 refers not only to the correction history table 121*a* but also to the evaluation correspondence table 123. In accordance with weight values designated in the evaluation correspondence table 123, the correction history analysis section 151 then weights correction processes and calculates the degree of suppression and the degree of glorification.

FIG. 17 is a view showing an example of the data structure of the mark information table. The mark information table 114 includes Old Document, Starting Point, Number of Characters, and Character String columns. Pieces of information in these columns included in one row are associated with one another and make up a piece of mark information.

Identification information for a document before correction is set in the Old Document column. A numeric value indicative of where the leading character of a character string designated as an important passage is from the head of a document is set in the Starting Point column. The number of characters included in the character string designated as an important passage is set in the Number of Characters column. The character string designated as an important passage is set in the Character String column.

The document correction section 141 can register how an important passage is corrected in the correction history table 121*a* by referring to the mark information table 114 having the above data structure.

Figure 18:
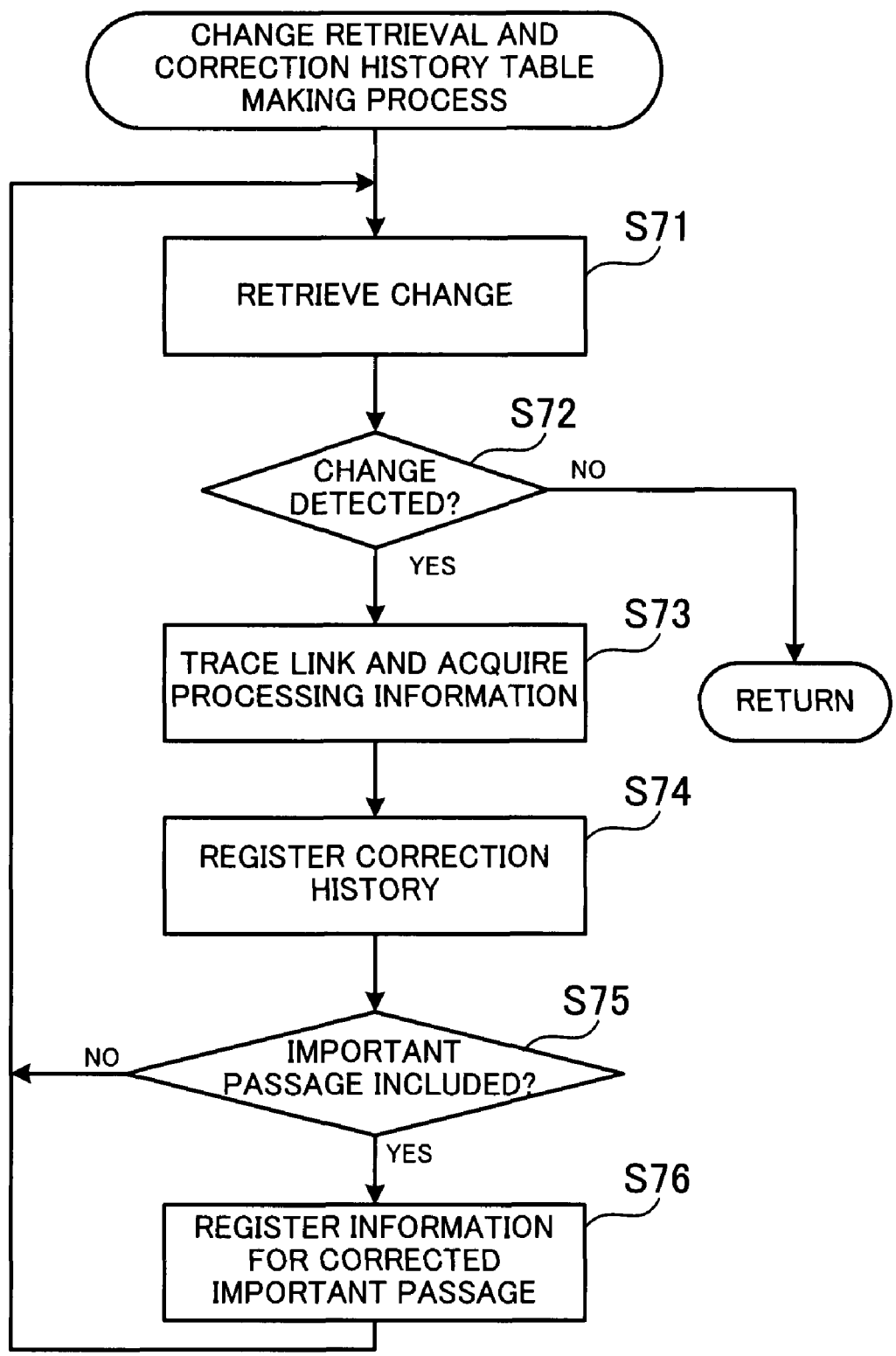
FIG. 18 is a flow chart showing a procedure for a change retrieval and correction history table making process in the second embodiment of the present invention.

FIG. 18 is a flow chart showing a procedure for a change retrieval and correction history table making process in the second embodiment of the present invention. Steps S71 through S74 included in the process shown in FIG. 18 are the same as steps S51 through S54, respectively, included in the process in the first embodiment of the present invention shown in FIG. 12, so descriptions of them will be omitted.

[Step S75] The document correction section 141 refers to the mark information table 114 and determines whether an important passage is included in corrections indicated by correction histories. If an important passage is included, then step S76 is performed. If an important passage is not included, then step S71 is performed.

[Step S76] The document correction section 141 registers information for the corrected important passage in the correction history table 121*a*. To be concrete, the document correction section 141 associates the number of characters corrected in the important passage (number of characters deleted in the case of a deletion process or the number of characters before replacement in the case of a replacement process) and the number of characters included in the important passage indicated by mark information with a correction history registered in the correction history table 121*a* in step S74 and registers them in the correction history table 121a. After that, step S71 is performed.

FIG. 19 is a view showing an example of the data structure of the correction history table in the second embodiment of the present invention. The correction history table 121a differs from the correction history table 121 in the first embodiment of the present invention shown in FIG. 13 in that it includes Correction Mark Character Number and Mark Character Number columns.

Of corrected characters, the number of characters designated as an important passage by mark information is set in the Correction Mark Character Number column. The number of characters included in the entire important passage designated by the mark information is set in the Mark Character Number column.

FIG. 20 is a view showing an example of the data structure of the evaluation correspondence table. Data is registered in the evaluation correspondence table 123 in the form of a matrix. A deletion rate, an addition rate, a replacement Rate, and an important passage correction rate are set as column headers. Weight regarding an indicator indicated as a column header is set in each column of the evaluation correspondence table 123.

Each indicator indicated in the evaluation correspondence table 123 is not an individual indicator of each correction history, but an indicator based on all correction processes including the correction processes performed on the original document 111 and the last correction processes by which the document 113 is obtained. To be concrete, a deletion rate is a value obtained by dividing the number of characters deleted by all deletion processes by the total number of characters included in all of the documents 111 and 112 corresponding to old documents. An addition rate is a value obtained by dividing the number of characters added by all addition processes by the total number of the characters included in all of the documents 111 and 112 corresponding to old documents. A replacement rate is a value obtained by dividing the number of characters before replacement in all replacement processes by the total number of the characters included in all of the documents 111 and 112 corresponding to old documents.

An important passage correction rate is the ratio of character strings deleted of replaced by correction processes to character strings designated as important passages by mark information. An important passage correction rate is calculated by important passage correction rate=(number of characters included in important passages deleted+number of characters included in important passages before replacement)/(total number of characters included in important passages included in document)

The degree of suppression, the degree of glorification, and the like are set as row headers. Weight regarding an indicator in each column used for calculating the value of a row header is set in each row of the evaluation correspondence table 123.

The degree of suppression and the degree of glorification are calculated on the basis of the evaluation correspondence table 123 having the above data structure. To be concrete, the value of a row header is obtained by multiplying each weight value set in the row and a corresponding indicator together and by totaling multiplication results.

Figure 21:
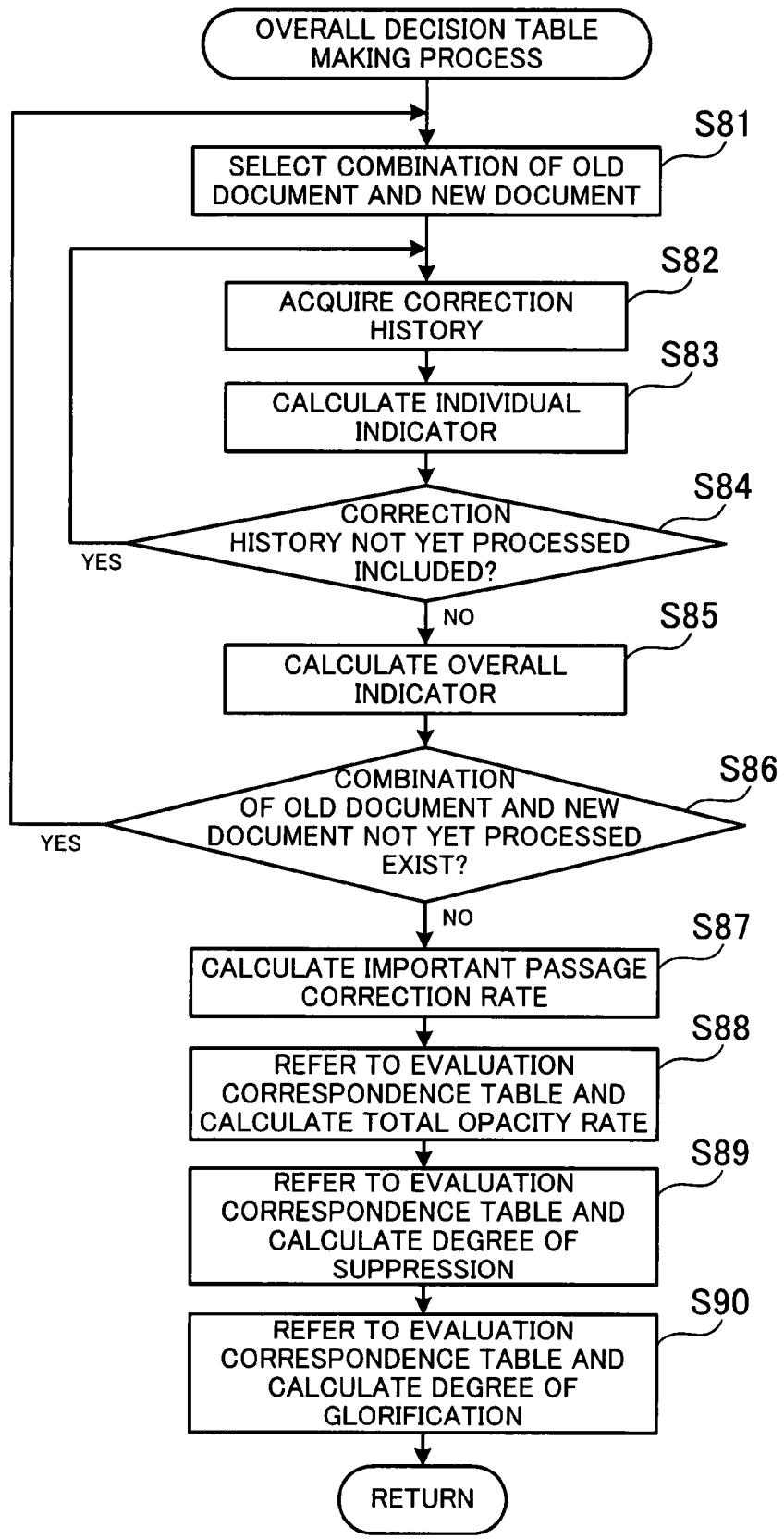
FIG. 21 is a flow chart showing a procedure for an overall decision table making process in the second embodiment of the present invention.

In the example shown in FIG. 20, the degree of suppression is calculated by degree of suppression=1.0×deletion rate+1.0×important passage correction rate The degree of glorification is calculated by degree of glorification=1.0×addition rate+1.0×replacement rate FIG. 21 is a flow chart showing a procedure for an overall decision table making process in the second embodiment of the present invention. The process shown in FIG. 21 will now be described in order of step number. Steps S81 through S86 are the same as steps S61 through S66, respectively, included in the overall decision table making process in the first embodiment of the present invention shown in FIG. 14, so descriptions of them will be omitted.

[Step S87] The correction history analysis section 151 calculates an important passage correction rate. To be concrete, the correction history analysis section 151 refers to the correction history table 121a and calculates the total of correction mark character numbers (number of characters deleted and the number of characters before replacement in replacement processes) of the character strings designated as important passages by the mark information. The important passage correction rate is obtained by dividing the total of correction mark character numbers by the total number of characters included in important passages of the original document 111.

[Step S88] The correction history analysis section 151 calculates an information opacity rate (total opacity rate) from the time when a document was prepared to the time when a final correction was made. In this case, the correction history analysis section 151 refers to the evaluation correspondence table 123. If a total opacity rate is set as a row header, then the correction history analysis section 151 multiplies each weight value shown in the corresponding row and the value of an indicator together and totals multiplication results. By doing so, the total opacity rate is obtained. The correction history analysis section 151 then registers the total opacity rate calculated in the overall decision table 122.

[Step S89] The correction history analysis section 151 calculates the degree of information suppression from the time when the document was prepared to the time when the final correction was made. In this case, the correction history analysis section 151 refers to the evaluation correspondence table 123. If the degree of suppression is set as a row header, then the correction history analysis section 151 multiplies each weight value shown in the corresponding row and the value of an indicator together and totals multiplication results. By doing so, the degree of suppression is obtained. The correction history analysis section 151 then registers the degree of suppression calculated in the overall decision table 122.

[Step S90] The correction history analysis section 151 calculates the degree of information glorification from the time when the document was prepared to the time when the final correction was made. In this case, the correction history analysis section 151 refers to the evaluation correspondence table 123. If the degree of glorification is set as a row header, then the correction history analysis section 151 multiplies each weight value shown in the corresponding row and the value of an indicator together and totals multiplication results. By doing so, the degree of glorification is obtained. The correction history analysis section 151 then registers the degree of glorification calculated in the overall decision table 122. After that, the process terminates.

To make an overall evaluation, a deletion rate, a replacement rate, an addition rate, and the like can be weighted in this way. For example, suppression is thought to mean that an original character string is deleted to suppress information. Accordingly, the weight of a deletion rate corresponding to the degree of suppression is set to a high value. In addition, glorification is thought to mean that an original character string is garnished with other words. Therefore, the weight of an addition rate and a replacement rate corresponding to the degree of glorification is set to a high value. By adding a weight value to the evaluation correspondence table 123 in the same way, a specific evaluation value can be defined.

According to the second embodiment of the present invention, the author of the original document 111 prepares it by the use of the document input unit 21. In addition, the author can designate a passage which he/she thinks to be important as an important passage. The designated important passage is registered in the mark information table 114 stored in the document database 110*a* as mark information.

Another editor corrects the document 111 by the use of the document editing unit 22 and stores the corrected document again in the document database 110*a*. Information indicative of a correction, a correction type, and whether the correction corresponds to one of passages registered in the mark information table is written in the correction history table 121*a*. The degree of a correction made in an important passage is calculated as an "important passage correction rate" which can be reflected in, for example, the degree of suppression.

Accordingly, if a portion which the author of the original document designated as an important passage is corrected, the degree of suppression becomes high. As a result, if important information is suppressed, it is easy to recognize by referring to the overall decision table 122 that information opacity in the organization is high.

Third Embodiment

In a third embodiment of the present invention, a tendency to suppress information can be measured according to post or division by the use of a personnel database. In addition, in the third embodiment of the present invention tendencies, such as information transparency, in each period can be measured.

Figure 22:
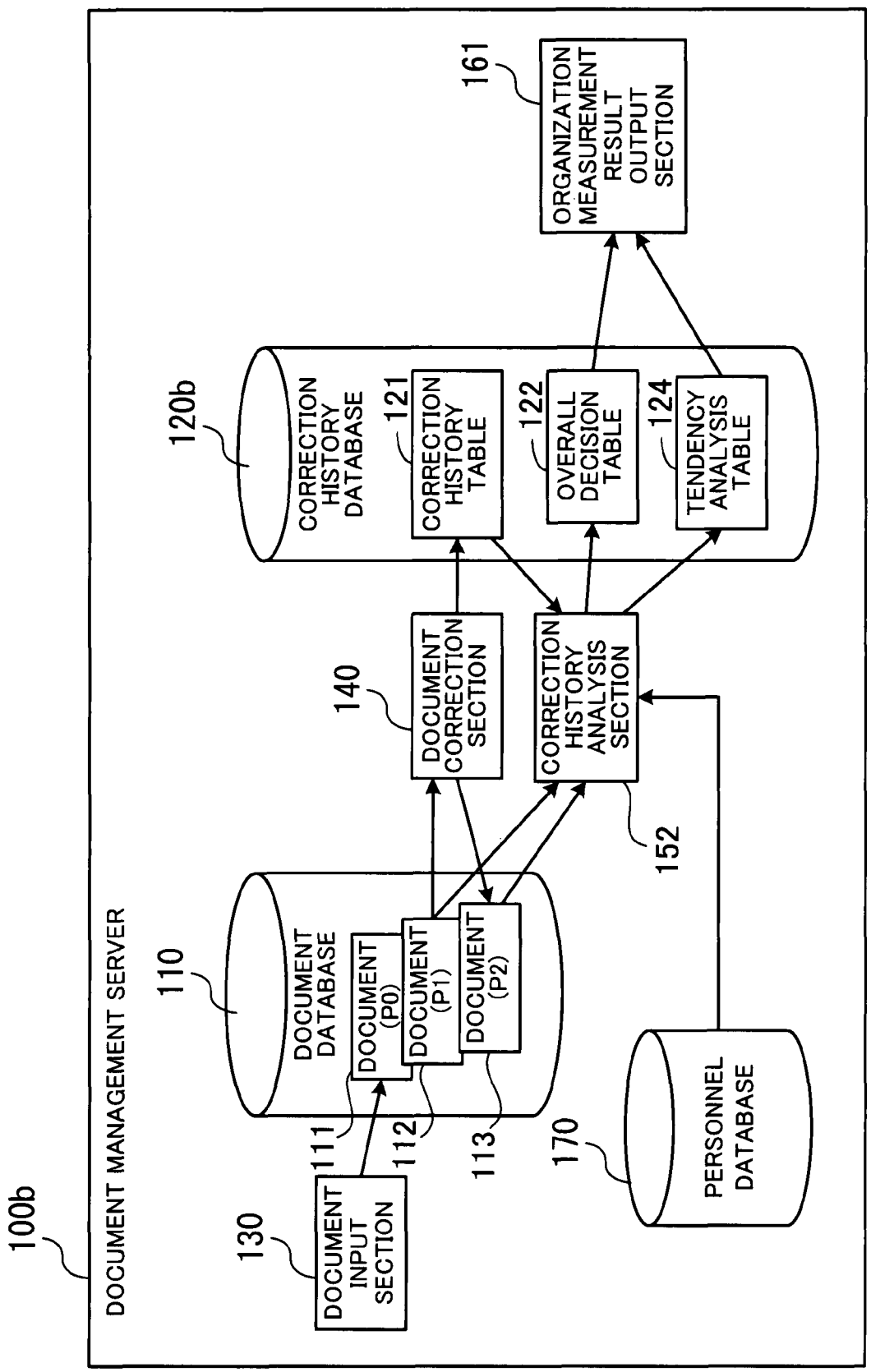
FIG. 22 is a block diagram showing the function of a document management server according to a third embodiment of the present invention.

FIG. 22 is a block diagram showing the function of a document management server according to the third embodiment of the present invention. Components which are shown in FIG. 22 and which have the same functions as those of the first embodiment of the present invention are marked with the same symbols and descriptions of them will be omitted. The differences between the document management servers according to the first and third embodiments of the present invention will now be described.

In addition to a correction history table 121 and an overall decision table 122, a tendency analysis table 124 is stored in a correction history database 120*b* of a document management server 100*b* according to the third embodiment of the present invention. The tendency analysis table 124 is a data table in which results obtained by determining information transparency in each period according to division and post are registered.

The document management server 100*b* also includes a personnel database 170. Personnel information regarding each member of the organization is registered in the personnel database 170.

A correction history analysis section 152 makes the overall decision table 122 and makes the tendency analysis table 124 by referring to the personnel database 170.

In response to a request from the measurement result display unit 24 to acquire measurement results, an organization measurement result output section 161 reads out the overall decision table 122 and the tendency analysis table 124 from the correction history database 120*b* and sends them to the measurement result display unit 24.

FIG. 23 is a view showing an example of the data structure of the personnel database. The personnel database 170 includes Name, Division, and Post columns.

The name of a user who is a member of the organization is registered in the Name column. A division to which the user belongs is registered in the Division column. A post in the organization which the user occupies is registered in the Post column.

A process for making the tendency analysis table 124 will now be described.

Figure 24:
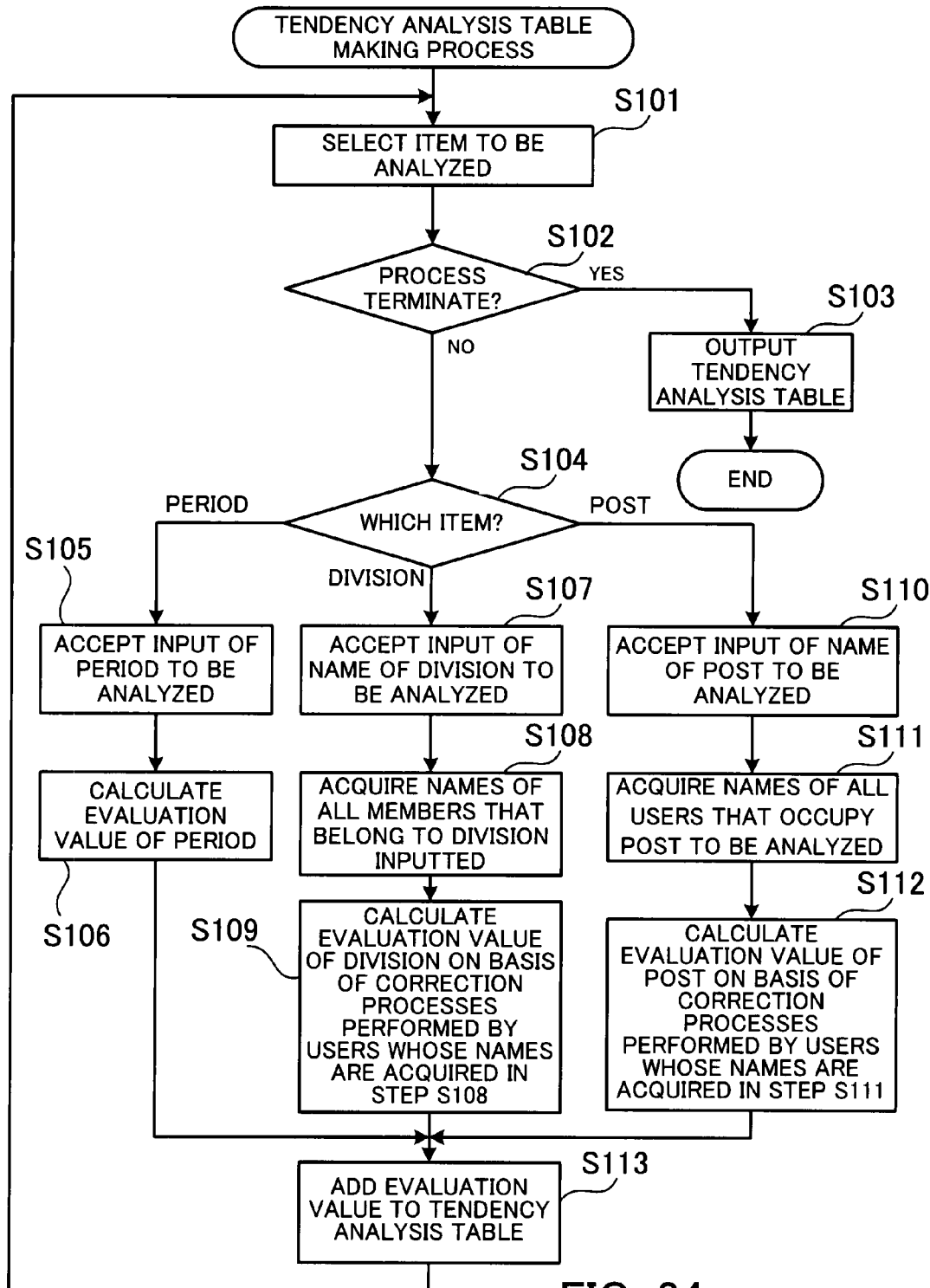
FIG. 24 is a flow chart showing a procedure for a tendency analysis table making process.

FIG. 24 is a flow chart showing a procedure for a tendency analysis table making process. The tendency analysis table making process is performed by the correction history analysis section 152 in response to operation input provided by a user via the analysis designation unit 23. The process shown in FIG. 24 will now be described in order of step number.

[Step S101] The correction history analysis section 152 selects an item to be analyzed. To be concrete, the correction history analysis section 152 determines a designated analysis item sent from the analysis designation unit 23. An analysis item is a period, a division, or a post.

[Step S102] If an analysis item is not designated by the analysis designation unit 23 and instructions to terminate an analysis process are inputted from the analysis designation unit 23, then the correction history analysis section 152 proceeds to step S103. If an analysis item is designated, then the correction history analysis section 152 proceeds to step S104.

[Step S103] The correction history analysis section 152 stores the tendency analysis table 124 it made in the correction history database 120*b*. After that, the process terminates.

[Step S104] If the analysis item designated is a period, then the correction history analysis section 152 proceeds to step S105. If the analysis item designated is a division, then the correction history analysis section 152 proceeds to step S107. If the analysis item designated is a post, then the correction history analysis section 152 proceeds to step S110.

[Step S105] If the analysis item designated is a period, then the correction history analysis section 152 accepts input of a period to be analyzed from the user via the analysis designation unit 23.

[Step S106] The correction history analysis section 152 searches the correction history table 121 and calculates each evaluation value (total opacity rate, the degree of suppression, and the degree of glorification) only on the basis of correction processes performed in the designated period. The evaluation value of the period is the average of values calculated for individual original documents. After that, the correction history analysis section 152 proceeds to step S113.

[Step S107] If the analysis item designated is a division, then the correction history analysis section 152 accepts input of the name of a division to be analyzed from the user via the analysis designation unit 23.

[Step S108] The correction history analysis section 152 retrieves the names of all users that belong to the division to be analyzed from the personnel database 170.

[Step S109] The correction history analysis section 152 searches the correction history table 121 and calculates each evaluation value (total opacity rate, the degree of suppression, and the degree of glorification) on the basis of correction processes performed by users whose names are acquired in step S108. The evaluation value of the division is the average of values calculated for individual documents corrected by the users. After that, the correction history analysis section 152 proceeds to step S113.

[Step S110] If the analysis item designated is a post, then the correction history analysis section 152 accepts input of the name of a post to be analyzed from the user via the analysis designation unit 23.

[Step S111] The correction history analysis section 152 retrieves the names of all users that occupy the post to be analyzed from the personnel database 170.

[Step S112] The correction history analysis section 152 searches the correction history table 121 and calculates each evaluation value (total opacity rate, the degree of suppression, and the degree of glorification) on the basis of correction processes performed by users whose names are acquired in step S111. The evaluation value of the post is the average of values calculated for individual documents corrected by the users.

[Step S113] The correction history analysis section 152 adds the evaluation value it calculated in step S106, S109, or S112 to the tendency analysis table 124. After that, the correction history analysis section 152 proceeds to step S101.

The tendency analysis table 124 is made in this way.

FIG. 25 is a view showing an example of the data structure of the tendency analysis table. The tendency analysis table 124 includes Item, Average Opacity Rate, Average Degree of Suppression, and Average Degree of Glorification columns.

An item to be analyzed is set in the Item column.

The average of total opacity rates that are calculated for documents corresponding to the item to be analyzed is set in the Average Opacity Rate column. For example, if an item to be analyzed is a period, then the average of total opacity rates that are calculated for documents corrected during the period is set. If an item to be analyzed is a division, then the average of total opacity rates that are calculated for documents corrected by users who belong to the division is set. If an item to be analyzed is a post, then the average of total opacity rates that are calculated for documents corrected by users who occupy the post is set.

The average of degrees of suppression that are calculated for documents corresponding to the item to be analyzed is set in the Average Degree of Suppression column.

The average of degrees of glorification that are calculated for documents corresponding to the item to be analyzed is set in the Average Degree of Glorification column.

As stated above, the tendency or degree of corrections made in a plurality of documents can be measured on the basis of the correction history table 121. In addition, overall tendencies in the organization (degree of corrections according to post, the degree of corrections according to division, and the like) can be calculated by referring to the personnel database 170. These values can be written into the tendency analysis table 124. Moreover, the name of a corrector and correction time are recorded in the correction history table 121, so "correction tendencies during a certain period" can also be written into the tendency analysis table 124 on the basis of these pieces of information. As a result, information transparency according to post, division, or period can be recognized.

In the example shown in FIG. 25, for example, a document opacity rate during the year 2005 is higher than a document opacity rate during the year 2004. The degree of suppression in the manufacturing department is higher than the degree of suppression in the sales department and the degree of glorification in the sales department is higher than the degree of glorification in the manufacturing department. In addition, an average opacity rate tends to rise with an increase in the level of a post.

In this example, the three items "period," "division," and "post" are set as items to be analyzed. By designating an item the tendency of which should be observed first, the tendency of an arbitrary item can be analyzed. If "period" is designated, a user is prompted to input a concrete date. A correction history corresponding to the date inputted is retrieved from the correction history table and the average of the evaluation values of a corresponding document is calculated. If "division" or "post" is designated, the personnel database is referred to once. All names that belong to "division" designated or all names that occupy "post" designated are enumerated and a correction history corresponding to a person of each name is retrieved from the correction history table. When the processing of all items designated is completed, the tendency analysis table 124 is stored in the correction history database 120b. The tendency analysis table 124 is outputted by the organization measurement result output section 160 in response to a request from the measurement result display unit 24. The contents of the tendency analysis table 124 are displayed on a screen of the measurement result display unit 24 and a user can look at them.

The above functions can be realized with a computer. In this case, a program in which the contents of the functions the document management server should have are described is provided. By executing this program on the computer, the above functions are realized on the computer. This program can be recorded on a computer-readable recording medium. A computer-readable recording medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a digital versatile disk (DVD), a digital versatile disk random access memory (DVD-RAM), a compact disk read only memory (CD-ROM), a compact disk recordable (CD-R)/rewritable (CD-RW), or the like. A magneto-optical recording medium can be a magneto-optical disk (MO) or the like.

To place the program on the market, portable recording media, such as DVDs or CD-ROMs, on which it is recorded are sold. Alternatively, the program is stored in advance on a hard disk in a server computer and is transferred from the server computer to another computer via a network.

When the computer executes this program, it will store the program, which is recorded on a portable recording medium or which is transferred from the server computer, on, for example, its hard disk. Then the computer reads the program from its hard disk and performs processes in compliance with the program. The computer can also read the program directly from a portable recording medium and perform processes in compliance with the program. Furthermore, each time the program is transferred from the server computer, the computer can perform processes in turn in compliance with the program it receives.

The present invention is not limited only to the above embodiments. Various modifications or changes can be made without departing from the spirit of the present invention.

In the present invention a correction history of documents is stored in advance. An opacity rate the value of which becomes higher with an increase in the number of characters deleted from a document or the number of characters before replacement is used and a decision table is made on the basis of the correction history. Therefore, the amount of information which is included in a document before correction and which is not reflected in a document after the correction can be known by referring to the decision table. As a result, information transparency in an organization can be recognized.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable recording medium on which a document management program for managing a correction history of a document is recorded, the program making a computer function as:
    a document store section for storing the document;
    a correction history table store section for storing a correction history table;
    a document input section for accepting input of the document which is original and for storing the document inputted in the document store section;
    a document correction section for correcting a character string of the document stored in the document store section in response to operation input, for registering a correction history including a number of characters deleted by a character string deletion process and a correction history including a number of characters before replacement by a replacement process in the correction history table, and for storing the corrected document in the document store section; and
    a correction history analysis section for referring to the correction history table to make a decision table including an opacity rate, the opacity rate obtained by dividing a total of the number of the characters deleted by the character string deletion process and the number of the characters before the replacement by the replacement process by a number of characters included in the original document.

2. The non-transitory computer-readable recording medium according to claim 1, wherein:
    the document correction section registers a correction history indicative of a character string deletion process, a character string addition process, and a character string replacement process performed on the document in the correction history table; and
    if a character string is added at a place where a character string is deleted, the document correction section recognizes that character string replacement is performed, and registers a correction history in the correction history table.

3. The non-transitory computer-readable recording medium according to claim 1, wherein if a correction is made in the document more than one time, the correction history analysis section divides a total of a number of characters deleted from a plurality of documents to be corrected by a deletion process and a number of characters replaced in the plurality of documents to be corrected by a replacement process by a total of a number of characters included in the plurality of documents to be corrected, and uses a division result as the opacity rate of the information indicated in the document.

4. The non-transitory computer-readable recording medium according to claim 1, wherein if a correction is made in the document more than one time, the correction history analysis section divides a total of a number of characters deleted from a plurality of documents to be corrected by a deletion process by a total of a number of characters included in the plurality of documents to be corrected, and uses a division result in the decision table as a degree of suppression of information indicated in the document.

5. The non-transitory computer-readable recording medium according to claim 1, wherein:
    the document correction section registers a correction history indicative of a character string deletion process, a character string addition process, and a character string replacement process performed on the document in the correction history table; and
    if a correction is made in the document more than one time, the correction history analysis section divides a total of a number of characters added to a plurality of documents to be corrected and a number of characters replaced by a replacement process by a total of a number of characters included in the plurality of documents to be corrected, and uses a division result in the decision table as a degree of glorification of information indicated in the document.

6. The non-transitory computer-readable recording medium according to claim 1, wherein:
    when a character string included in the document is designated as an important passage, the document input section stores mark information indicative of the important passage in the document store section;
    the document correction section refers to the mark information and sets, in the case of the important passage being included in a character string deleted by a deletion process, a number of characters deleted from the important passage in the correction history; and
    the correction history analysis section adds to the opacity rate a value which becomes higher with an increase in the number of the characters deleted from the important passage by the deletion process or an increase in a number of characters included in the important passage before replacement by a replacement process.

7. The non-transitory computer-readable recording medium according to claim 1, the program further making the computer function as an evaluation correspondence table store section for storing an evaluation correspondence table in which weight values are set for a deletion process, an addition process, and a replacement process, wherein:
    the document correction section registers a correction history indicative of a character string deletion process, a character string addition process, and a character string replacement process performed on the document in the correction history table; and
    the correction history analysis section refers to the evaluation correspondence table, multiplies the weight value set for a deletion process and the number of the characters deleted together, multiplies the weight value set for an addition process and a number of characters added together, multiplies the weight value set for a replacement process and the number of the characters before replacement together, and uses an opacity rate which indicates information opacity in an organization and the value of which becomes higher with an increase in the number of the characters deleted from the document.

8. The non-transitory computer-readable recording medium according to claim 1, wherein when a condition of a document to be analyzed is inputted, the correction history analysis section extracts correction histories which meet the condition from the correction history table and calculates the opacity rate on the basis of the correction history extracted.

9. The non-transitory computer-readable recording medium according to claim 8, wherein:
    the document correction section sets the time when corrections are made in the correction histories; and if a period in which a correction is made is designated as the condition of a document to be analyzed, the correction history analysis section extracts the correction histories indicative of correction processes performed in the period from the correction history table.

10. The non-transitory computer-readable recording medium according to claim 8, wherein:
the document correction section sets user names of users who input instructions to make a correction in the correction histories; and
if a division to which a corrector belongs is designated as the condition of a document to be analyzed, the correction history analysis section refers to a personnel database in which user names of users who belong to each division in an organization are registered, acquires user names of users who belong to the designated division, and extracts the correction histories including the acquired user names from the correction history table.

11. The non-transitory computer-readable recording medium according to claim 8, wherein:
the document correction section sets user names of users who input instructions to make a correction in the correction histories; and
if a post in an organization which a corrector occupies is designated as the condition of a document to be analyzed, the correction history analysis section refers to a personnel database in which a post of each user in an organization is registered, acquires user names of users who occupy the designated post, and extracts the correction histories including the acquired user names from the correction history table.

12. A document management apparatus for managing a correction history of a document, the apparatus comprising:
a document management server controlled by a central processing unit;
a document store section for storing the document;
a correction history table store section for storing a correction history table;
a document input section for accepting input of the document which is original and for storing the document inputted in the document store section;
a document correction section for correcting a character string of the document stored in the document store section in response to operation input, for registering a correction history including a number of characters deleted by a character string deletion process and a correction history including a number of characters 5 before replacement by a replacement process in the correction history table, and for storing the corrected document in the document store section; and
a correction history analysis section for referring to the correction history table to make a decision table including an opacity rate, the opacity rate obtained by dividing a total of the number of the characters deleted by the character string deletion process and the number of the characters before the replacement by the replacement process by a number of characters included in the original document.

13. The document management apparatus according to claim 12, wherein:
the document correction section registers a correction history indicative of a character string deletion process, a character string addition process, and a character string replacement process performed on the document in the correction history table; and
if a character string is added at a place where a character string is deleted, the document correction section recognizes that character string replacement is performed, and registers a correction history in the correction history table.

14. The document management apparatus according to claim 12, wherein if a correction is made in the document more than one time, the correction history analysis section divides a total of a number of characters deleted from a plurality of documents to be corrected by a deletion process by a total of a number of characters included in the plurality of documents to be corrected, and uses a division result in the decision table as a degree of suppression of information indicated in the document.

15. A document management method for managing a correction history of a document, the method comprising the steps of:
accepting, by a document input section, input of the document which is original and storing, by the document input section, the document inputted in a document store section;
correcting, by a document correction section, a character string of the document stored in the document store section in response to operation input, registering, by the document correction section, a correction history including a number of characters deleted by a character string deletion process and a correction history including a number of characters before replacement by a replacement process in the correction history table, and storing, by the document correction section, the corrected document in the document store section; and
referring, by a correction history analysis section, to the correction history table, and making, by the correction history analysis section, a decision table including an opacity rate, the opacity rate obtained by dividing a total of the number of the characters deleted by the character string deletion process and the number of the characters before the replacement by the replacement process by a number of characters included in the original document.

16. The document management method according to claim 15, wherein:
a correction history indicative of a character string deletion process, a character string addition process, and a character string replacement process performed on the document are registered in the correction history table by the document correction section; and
if a character string is added at a place where a character string is deleted, it is recognized by the document correction section that character string replacement is performed, and a correction history is registered in the correction history table.

17. The document management method according to claim 15, wherein if a correction is made in the document more than one time, a total of a number of characters deleted from a plurality of documents to be corrected by a deletion process is divided by a total of a number of characters included in the plurality of documents to be corrected, by the correction history analysis section and a division result is used in the decision table as a degree of suppression of information indicated in the document.

* * * * *

UNITED STATES PATENT AND TRADEMARK OFFICE
CERTIFICATE OF CORRECTION

| | | |
|---|---|---|
| PATENT NO. | : 7,904,808 B2 | Page 1 of 1 |
| APPLICATION NO. | : 11/897147 | |
| DATED | : March 8, 2011 | |
| INVENTOR(S) | : Harada | |

It is certified that error appears in the above-identified patent and that said Letters Patent is hereby corrected as shown below:

In the Claims:

Col. 25, Line 47   Delete "characters 5" and insert --characters--
Claim 12

Signed and Sealed this
Sixteenth Day of August, 2011

David J. Kappos
*Director of the United States Patent and Trademark Office*